US012531671B2

(12) United States Patent
Kanamarlapudi et al.

(10) Patent No.: US 12,531,671 B2
(45) Date of Patent: Jan. 20, 2026

(54) TECHNIQUES FOR APPLICATION DATA UNIT SIGNALING

(71) Applicant: QUALCOMM Incorporated, San Diego, CA (US)

(72) Inventors: Sitaramanjaneyulu Kanamarlapudi, San Diego, CA (US); Prashanth Haridas Hande, San Diego, CA (US); Ravi Agarwal, San Diego, CA (US); Yih-Hao Lin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 232 days.

(21) Appl. No.: 17/589,680

(22) Filed: Jan. 31, 2022

(65) Prior Publication Data

US 2023/0246750 A1 Aug. 3, 2023

(51) Int. Cl.
*H04L 1/1867* (2023.01)
*H04L 5/00* (2006.01)

(52) U.S. Cl.
CPC ............ *H04L 1/189* (2013.01); *H04L 1/1893* (2013.01); *H04L 5/0048* (2013.01)

(58) Field of Classification Search
CPC ....... H04L 1/0067; H04L 1/08; H04L 1/0013; H04L 1/1685; H04L 1/1893; H04L 5/00; H04L 5/0048; H04L 5/0053; H04L 5/0091; H04L 47/32; H04L 47/34; H04L 69/22; H04W 80/02
See application file for complete search history.

(56) References Cited

U.S. PATENT DOCUMENTS

| 11,582,288 | B2 | 2/2023 | Zhu et al. | |
| 2018/0241509 | A1* | 8/2018 | Phuyal | H04L 1/1614 |
| 2019/0297530 | A1* | 9/2019 | Ohta | H04W 28/06 |
| 2020/0213242 | A1* | 7/2020 | Zheng | H04W 28/065 |
| 2022/0159768 | A1* | 5/2022 | Zhu | H04L 1/1642 |
| 2022/0209903 | A1* | 6/2022 | Zhang | H04W 28/04 |
| 2022/0224446 | A1* | 7/2022 | Fan | H04L 1/1812 |
| 2022/0255704 | A1* | 8/2022 | Yi | H04L 5/0055 |
| 2022/0408305 | A1* | 12/2022 | Jin | H04W 28/0263 |
| 2023/0069008 | A1* | 3/2023 | Manithara | H04W 28/02 |
| 2023/0164081 | A1* | 5/2023 | Rossbach | H04W 28/0263 370/235 |
| 2024/0073302 | A1* | 2/2024 | Chun | H04L 47/2441 |
| 2024/0089795 | A1* | 3/2024 | Chun | H04L 47/32 |
| 2024/0146794 | A1* | 5/2024 | Rossbach | H04L 65/80 |
| 2024/0236215 | A1* | 7/2024 | Fu | H04L 69/22 |

* cited by examiner

*Primary Examiner* — Thomas R Cairns
(74) *Attorney, Agent, or Firm* — QUALCOMM Incorporated

(57) ABSTRACT

Methods, systems, and devices for wireless communication are described. A device (e.g., a user equipment (UE) or a base station) may communicate (e.g., receive or transmit) a set of service data units (SDUs) of an application data unit (ADU). The device may be aware of the set of SDUs corresponding to the ADU based on an identifier in a header of the set of SDUs. The device may determine that an SDU of the ADU is absent and proactively transmit a signal based on identifying the absent SDU. Signaling ADU awareness between distributed units (DUs) and a centralized unit (CU) of a base station is described. The CU may indicate that a set of SDUs correspond to an ADU via a user plane interface. For example, a header associated with the interface may include one or more bits identifying the ADU in a payload corresponding to the header.

29 Claims, 19 Drawing Sheets

TECHNIQUES FOR APPLICATION DATA UNIT SIGNALING

FIELD OF TECHNOLOGY

The following relates to wireless communication, including techniques for application data unit signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). UEs and base stations may be configured to communicate using packet-based transmissions. Some aspects of existing packet-based communication techniques, however, may be deficient or sub-optimal in some configurations.

SUMMARY

The described techniques relate to improved methods, systems, devices, and apparatuses that support techniques for application data unit (ADU) signaling. Generally, the described techniques provide for enabling devices in a wireless communications system to communicate based on a shared ADU awareness. In one example, a user equipment (UE) may communicate (e.g., receive in a downlink communication or transmit in an uplink communication) a set of service data units (SDUs) of an ADU. The UE may be aware of which SDUs correspond to the ADU based on an indication (e.g., an identifier in a header of the set of SDUs). The UE may determine that an SDU of the ADU is absent, for example, based on receiving an SDU corresponding to a subsequent ADU. In the case of downlink, the UE may proactively request retransmission of the absent SDU, or transmit a status indicating the absent SDU. In the case of uplink, the UE may proactively retransmit the absent SDU, for example, to satisfy an ADU delay budget. In a second example, a distributed unit (DU) of a base station may handle an absent SDU similar to the UE. For example, in the case of uplink, the DU may proactively request retransmission of the absent SDU, or transmit a status indicating the absent SDU. In the case of downlink, the DU may proactively retransmit the absent SDU, for example, based on an ADU content policy. Additionally or alternatively, the DU may select a component carrier in a carrier aggregation scheme for retransmitting the SDU based on the ADU content policy.

The described techniques may also provide for signaling ADU awareness between one or more DUs and a centralized unit (CU) of a base station. The CU may indicate that a set of SDUs correspond to an ADU via a user plane interface, such as an F1-U interface. For example, a header associated with the interface may include one or more bits identifying the ADU in a payload corresponding to the header.

A method for wireless communication at a UE is described. The method may include communicating, with a base station, a set of SDUs, a correspondence between the set of SDUs and an ADU being indicated by at least one header of the set of SDUs, identifying an absence of an SDU of the set of SDUs, and transmitting, to the base station, a signal associated with the SDU based on identifying the absence of the SDU, the signal proactively indicating information associated with the ADU to the base station.

An apparatus for wireless communication at a UE is described. The apparatus may include a processor, memory coupled with the processor, and instructions stored in the memory. The instructions may be executable by the processor to cause the apparatus to communicate, with a base station, a set of SDUs, a correspondence between the set of SDUs and an ADU being indicated by at least one header of the set of SDUs, identify an absence of an SDU of the set of SDUs, and transmit, to the base station, a signal associated with the SDU based on identifying the absence of the SDU, the signal proactively indicating information associated with the ADU to the base station.

Another apparatus for wireless communication at a UE is described. The apparatus may include means for communicating, with a base station, a set of SDUs, a correspondence between the set of SDUs and an ADU being indicated by at least one header of the set of SDUs, means for identifying an absence of an SDU of the set of SDUs, and means for transmitting, to the base station, a signal associated with the SDU based on identifying the absence of the SDU, the signal proactively indicating information associated with the ADU to the base station.

A non-transitory computer-readable medium storing code for wireless communication at a UE is described. The code may include instructions executable by a processor to communicate, with a base station, a set of SDUs, a correspondence between the set of SDUs and an ADU being indicated by at least one header of the set of SDUs, identify an absence of an SDU of the set of SDUs, and transmit, to the base station, a signal associated with the SDU based on identifying the absence of the SDU, the signal proactively indicating information associated with the ADU to the base station.

In some examples of the method, apparatuses, and non-transitory computer-readable medium described herein, transmitting the signal may include operations, features, means, or instructions for transmitting a request for a retransmission of the SDU, where the signal includes the request for the retransmission.

In some examples of the method, apparatuses, and non-transitory computer-readable medium described herein, transmitting the signal may include operations, features, means, or instructions for transmitting an indication of a status associated with the SDU, where the signal includes the indication.

In some examples of the method, apparatuses, and non-transitory computer-readable medium described herein, the status includes a packet data convergence protocol (PDCP) status.

In some examples of the method, apparatuses, and non-transitory computer-readable medium described herein, transmitting the signal may include operations, features, means, or instructions for transmitting the SDU in a retransmission.

In some examples of the method, apparatuses, and non-transitory computer-readable medium described herein, the SDU may be transmitted in the retransmission based on a delay budget associated with the ADU.

Some examples of the method, apparatuses, and non-transitory computer-readable medium described herein may further include operations, features, means, or instructions for discarding one or more SDUs of the set of SDUs based on a content policy associated with a reception of a set of bits including the ADU.

In some examples of the method, apparatuses, and non-transitory computer-readable medium described herein, the one or more discarded SDUs include the SDU and the signal may be transmitted based on discarding the one or more SDUs.

In some examples of the method, apparatuses, and non-transitory computer-readable medium described herein, the absence of the SDU may be identified based on a presence of a second SDU corresponding to a second ADU that may be scheduled after the ADU.

In some examples of the method, apparatuses, and non-transitory computer-readable medium described herein, the SDU includes a PDCP SDU or a radio link control (RLC) SDU.

A method for wireless communication at a CU of a base station is described. The method may include transmitting, via a user plane interface with one or more distributed units of the base station, an indication of an ADU including a set of SDUs, the indication including one or more bits in a header associated with the user plane interface and transmitting, based on transmitting the indication, a control signal that schedules a transmission of the set of SDUs corresponding to the ADU.

An apparatus for wireless communication at a CU of a base station is described. The apparatus may include a processor, memory coupled with the processor, and instructions stored in the memory. The instructions may be executable by the processor to cause the apparatus to transmit, via a user plane interface with one or more distributed units of the base station, an indication of an ADU including a set of SDUs, the indication including one or more bits in a header associated with the user plane interface and transmit, based on transmitting the indication, a control signal that schedules a transmission of the set of SDUs corresponding to the ADU.

Another apparatus for wireless communication at a CU of a base station is described. The apparatus may include means for transmitting, via a user plane interface with one or more distributed units of the base station, an indication of an ADU including a set of SDUs, the indication including one or more bits in a header associated with the user plane interface and means for transmitting, based on transmitting the indication, a control signal that schedules a transmission of the set of SDUs corresponding to the ADU.

A non-transitory computer-readable medium storing code for wireless communication at a CU of a base station is described. The code may include instructions executable by a processor to transmit, via a user plane interface with one or more distributed units of the base station, an indication of an ADU including a set of SDUs, the indication including one or more bits in a header associated with the user plane interface and transmit, based on transmitting the indication, a control signal that schedules a transmission of the set of SDUs corresponding to the ADU.

In some examples of the method, apparatuses, and non-transitory computer-readable medium described herein, the one or more bits may be included in a general packet radio service (GPRS) tunnelling protocol user (GTP-U) header of the header associated with the user plane interface.

In some examples of the method, apparatuses, and non-transitory computer-readable medium described herein, the one or more bits may be outside a GTP-U header of the header associated with the user plane interface.

In some examples of the method, apparatuses, and non-transitory computer-readable medium described herein, the one or more bits of the indication include a bit indicating that a payload associated with the header corresponds to the ADU.

Some examples of the method, apparatuses, and non-transitory computer-readable medium described herein may further include operations, features, means, or instructions for determining that at least a first header of the set of SDUs and a second header associated with a second user plane interface indicate a correspondence between the set of SDUs and the ADU, identifying an absence of an SDU of the set of SDUs, and transmitting a signal associated with the SDU based on identifying the absence of the SDU, the signal proactively indicating information associated with the ADU.

In some examples of the method, apparatuses, and non-transitory computer-readable medium described herein, transmitting the signal may include operations, features, means, or instructions for transmitting an indication of a status associated with the SDU, where the signal includes the indication.

In some examples of the method, apparatuses, and non-transitory computer-readable medium described herein, the signal may be transmitted based on a quantity of UE in communication with the base station, an error rate associated with the ADU, a content policy associated with a reception of a set of bits including the ADU, or any combination thereof.

Some examples of the method, apparatuses, and non-transitory computer-readable medium described herein may further include operations, features, means, or instructions for discarding one or more SDUs of the set of SDUs based on a content policy associated with a reception of a set of bits including the ADU.

In some examples of the method, apparatuses, and non-transitory computer-readable medium described herein, the one or more discarded SDUs include the SDU and the signal may be transmitted based on discarding the one or more SDUs.

In some examples of the method, apparatuses, and non-transitory computer-readable medium described herein, the absence of the SDU may be identified based on a presence of a second SDU corresponding to a second ADU that may be scheduled after the ADU.

In some examples of the method, apparatuses, and non-transitory computer-readable medium described herein, the SDU includes a PDCP SDU or an RLC SDU.

A method for wireless communication at a base station is described. The method may include communicating, with a UE, a set of SDUs, a correspondence between the set of SDUs and an ADU being indicated by at least one header of the set of SDUs, identifying an absence of an SDU of the set of SDUs, and transmitting, to the UE, a signal associated with the SDU based on identifying the absence of the SDU, the signal proactively indicating information associated with the ADU to the UE.

An apparatus for wireless communication at a base station is described. The apparatus may include a processor, memory coupled with the processor, and instructions stored in the memory. The instructions may be executable by the processor to cause the apparatus to communicate, with a UE, a set of SDUs, a correspondence between the set of SDUs and an ADU being indicated by at least one header of the set of SDUs, identify an absence of an SDU of the set of SDUs, and transmit, to the UE, a signal associated with the SDU based on identifying the absence of the SDU, the signal proactively indicating information associated with the ADU to the UE.

Another apparatus for wireless communication at a base station is described. The apparatus may include means for communicating, with a UE, a set of SDUs, a correspondence between the set of SDUs and an ADU being indicated by at least one header of the set of SDUs, means for identifying an absence of an SDU of the set of SDUs, and means for transmitting, to the UE, a signal associated with the SDU based on identifying the absence of the SDU, the signal proactively indicating information associated with the ADU to the UE.

A non-transitory computer-readable medium storing code for wireless communication at a base station is described. The code may include instructions executable by a processor to communicate, with a UE, a set of SDUs, a correspondence between the set of SDUs and an ADU being indicated by at least one header of the set of SDUs, identify an absence of an SDU of the set of SDUs, and transmit, to the UE, a signal associated with the SDU based on identifying the absence of the SDU, the signal proactively indicating information associated with the ADU to the UE.

In some examples of the method, apparatuses, and non-transitory computer-readable medium described herein, transmitting the signal may include operations, features, means, or instructions for transmitting a request for a retransmission of the SDU, where the signal includes the request for the retransmission.

In some examples of the method, apparatuses, and non-transitory computer-readable medium described herein, transmitting the signal may include operations, features, means, or instructions for transmitting an indication of a status associated with the SDU, where the signal includes the indication.

In some examples of the method, apparatuses, and non-transitory computer-readable medium described herein, the status includes a PDCP status.

In some examples of the method, apparatuses, and non-transitory computer-readable medium described herein, transmitting the signal may include operations, features, means, or instructions for transmitting the SDU in a retransmission.

In some examples of the method, apparatuses, and non-transitory computer-readable medium described herein, the SDU may be transmitted in the retransmission based on a delay budget associated with the ADU.

In some examples of the method, apparatuses, and non-transitory computer-readable medium described herein, the SDU may be transmitted via a component carrier in a carrier aggregation configuration and the component carrier may be selected based on a content policy associated with a reception of a set of bits including the ADU.

Some examples of the method, apparatuses, and non-transitory computer-readable medium described herein may further include operations, features, means, or instructions for discarding one or more SDUs of the set of SDUs based on a content policy associated with a reception of a set of bits including the ADU.

In some examples of the method, apparatuses, and non-transitory computer-readable medium described herein, the one or more discarded SDUs include the SDU and the signal may be transmitted based on discarding the one or more SDUs.

Some examples of the method, apparatuses, and non-transitory computer-readable medium described herein may further include operations, features, means, or instructions for receiving, via a user plane interface with a centralized unit of the base station, an indication of the ADU including the set of SDUs, the indication including one or more bits in a header associated with the user plane interface and receiving, based on receiving the indication, a control signal that schedules a transmission of the set of SDUs corresponding to the ADU.

In some examples of the method, apparatuses, and non-transitory computer-readable medium described herein, the absence of the SDU may be identified based on a presence of a second SDU corresponding to a second ADU that may be scheduled after the ADU.

In some examples of the method, apparatuses, and non-transitory computer-readable medium described herein, the SDU includes a PDCP SDU or an RLC SDU.

DETAILED DESCRIPTION

In some cases, a quality of service (QoS) in a wireless communications system may be based on performance indicators associated with packet transmission (e.g., transmission of internet protocol (IP) packets), such as a packet delay budget or a packet error rate. However, applications at a user equipment (UE) may communicate data in application data units (ADUs), where each ADU may include a set of packets (e.g., tens or hundreds of packets). Accordingly, applications at the UE may determine QoS based on performance indicators associated with ADUs, such as an ADU error rate, an ADU delay budget, an ADU content policy, or any combination thereof. It may be beneficial to enable devices in the wireless communications system to signal and determine QoS based on ADUs rather than packets to improve communications reliability.

According to the techniques described herein, devices in a wireless communications system may communicate based on a shared ADU awareness. In one example, a UE may communicate (e.g., receive in a downlink communication or transmit in an uplink communication) a set of service data units (SDUs) of an ADU. The UE may be aware of the SDUs corresponding to the ADU based on an identifier, for example, in a header of the set of SDUs. The UE may determine that an SDU of the ADU is absent, for example, based on receiving an SDU corresponding to a subsequent ADU. In the case of downlink, the UE may proactively request retransmission of the absent SDU, or transmit a status indicating the absent SDU. In the case of uplink, the UE may proactively retransmit the absent SDU, for example, to satisfy an ADU delay budget. In a second example, a distributed unit (DU) of a base station may handle an absent SDU similar to the UE. For example, in the case of uplink, the DU may proactively request retransmission of the absent SDU, or transmit a status indicating the absent SDU. In the case of downlink, the DU may proactively retransmit the absent SDU, for example, based on an ADU content policy. Additionally or alternatively, the DU may select a component carrier in a carrier aggregation scheme for retransmitting the SDU based on the ADU content policy.

Techniques are also described herein for signaling ADU awareness between DUs and a centralized unit (CU) of a base station. The CU may indicate that a set of SDUs correspond to an ADU via a user plane interface, such as an F1-U interface. For example, a header associated with the interface may include one or more bits identifying the ADU in a payload corresponding to the header.

Aspects of the disclosure are initially described in the context of wireless communications systems. Aspects of the disclosure are further illustrated by and described with reference to a protocol stack, a traffic flow, process flows, apparatus diagrams, system diagrams, and flowcharts that relate to techniques for ADU signaling.

Figure 1:
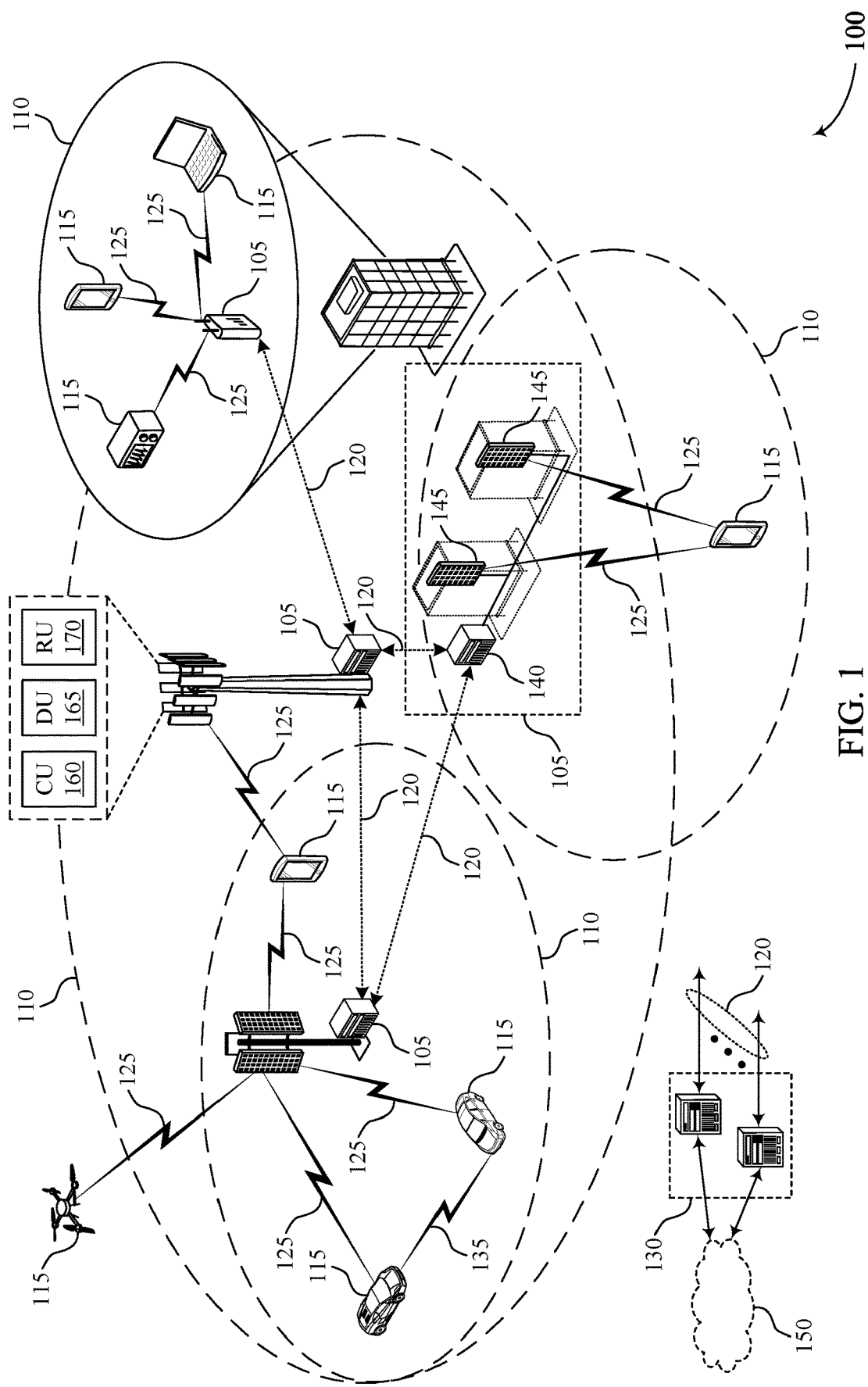
FIG. 1 illustrates an example of a wireless communications system that supports techniques for application data unit (ADU) signaling in accordance with aspects of the present disclosure.

FIG. 1 illustrates an example of a wireless communications system 100 that supports techniques for ADU signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to being carried out between UEs 115 and base stations 105, may be implemented via additional or alternative wireless devices, including DUs 165, CUs 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Devices in wireless communications system 100 may support communications based on a shared ADU awareness. In one example, a UE 115 may communicate (e.g., receive in a downlink communication or transmit in an uplink communication) a set of SDUs of an ADU. The UE 115 may identify the SDUs corresponding to the ADU based on an identifier (e.g., signaled in a header of the set of SDUs). The UE 115 may determine that an SDU of the ADU is absent, for example, based on receiving an SDU corresponding to a subsequent ADU. In the case of downlink, the UE 115 may proactively request retransmission of the absent SDU, or transmit a status indicating the absent SDU. In the case of uplink, the UE 115 may proactively retransmit the absent SDU, for example, to satisfy an ADU delay budget. In a second example, a DU 165 of a base station 105 may handle an absent SDU similar to the UE 115. For example, in the case of uplink, the DU 165 may proactively request retransmission of the absent SDU, or transmit a status indicating the absent SDU. In the case of downlink, the DU 165 may proactively retransmit the absent SDU, for example, based on an ADU content policy. Additionally or alternatively, the DU 165 may select a component carrier in a carrier aggregation scheme for retransmitting the SDU based on the ADU content policy.

Wireless communications system 100 may further support signaling of ADU awareness between DUs 165 and a CU 160 of a base station 105. The CU 160 may indicate that a set of SDUs correspond to an ADU via a user plane interface, such as an F1-U interface. For example, a header associated with the interface may include one or more bits identifying the ADU in a payload corresponding to the header.

Figure 2:
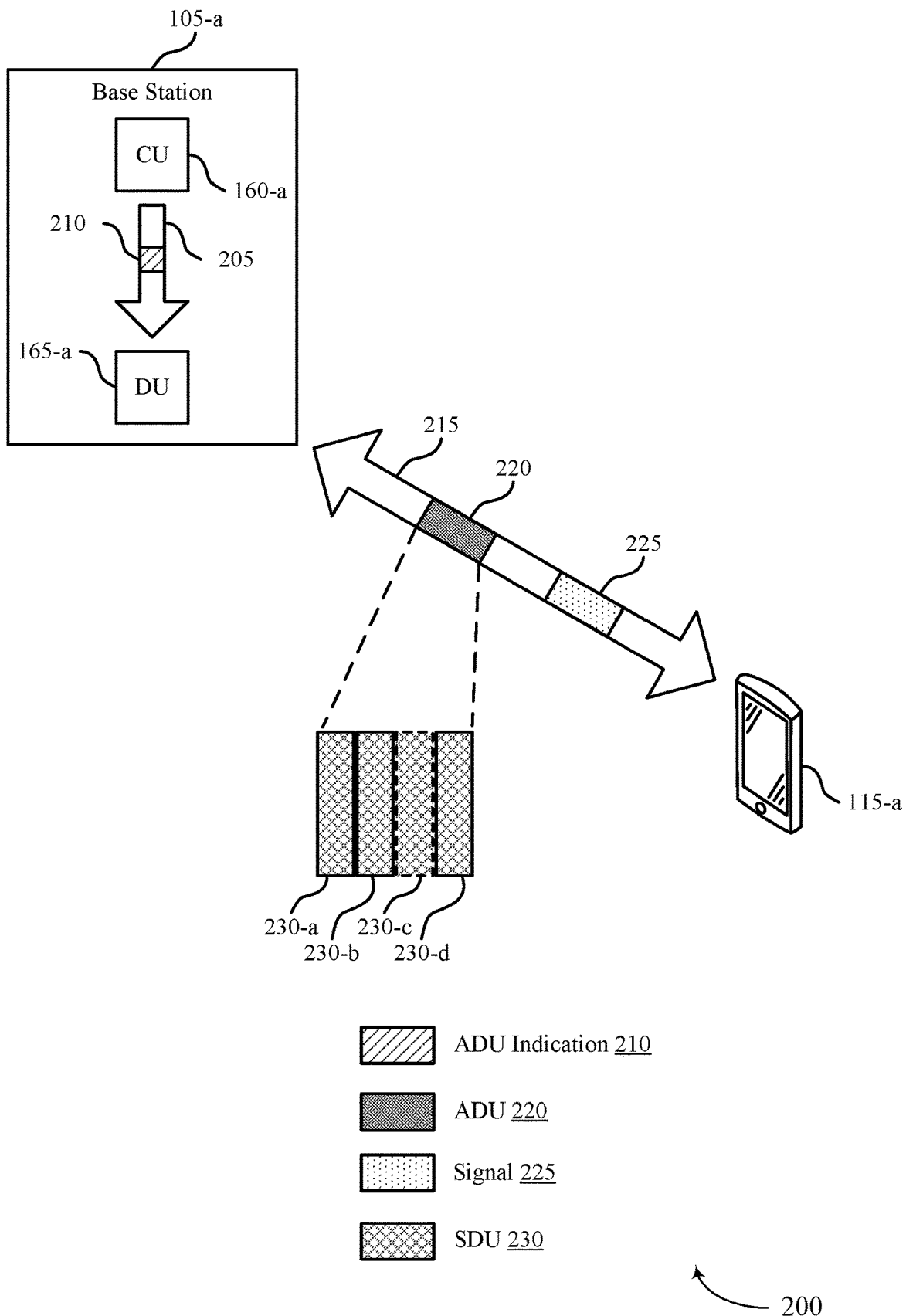
FIG. 2 illustrates an example of a wireless communications system that supports techniques for ADU signaling in accordance with aspects of the present disclosure.

FIG. 2 illustrates an example of a wireless communications system 200 that supports techniques for ADU signaling in accordance with aspects of the present disclosure. In some examples, the wireless communications system 200 may implement aspects of the wireless communications system 100. For example, the wireless communications system 200 may include a base station 105-*a* and a UE 115-*a*, which may be examples of the corresponding devices described with reference to FIG. 1. The wireless communications system 200 may include features for improved QoS for communications between the UE 115-*a* and the base station 105-*a*.

In some cases, a QoS for communications on a channel 215 between the UE 115-*a* and the base station 105-*a* may be based on key performance indicators (KPIs) associated with packets (e.g., IP packets), including a packet delay budget (e.g., an allowable latency associated with each packet, such as 100 ms), a packet error rate (e.g., an allowable fraction of packets that may be missed or absent without transmitting a negative acknowledgment (NACK) in HARQ feedback, such as $10^{-2}$), or both. However, applications at the UE 115-*a* may communicate data in ADUs 220, where each ADU 220 may include a set of packets (e.g., tens or hundreds of packets). Accordingly, applications may determine KPIs associated with ADUs 220, rather than at a level of individual packets. For example, KPIs associated with an ADU 220 may include an ADU error rate (e.g., an average quantity of ADUs 220 that may be received with errors), an ADU delay budget (e.g., a tolerable delay associated with an ADU 220, such as a maximum allowable delay), an ADU content policy (e.g., a policy associated with receiving bits that include the ADU 220, such as a minimum percentage of bits of the ADU 220 required to be delivered when the ADU 220 is FEC protected), or any combination thereof.

In some cases, it may not be feasible for the UE 115-a to translate KPIs associated with ADUs 220 to KPIs associated with packets (e.g., based on a packet delay budget or a packet error rate). For instance, the translation may result in a loss of information. As a first example, based on a conservative translation, a packet error rate may be less than a corresponding ADU error rate, resulting in a relatively low capacity for errors in communications. In a second example, an aggressive setting for the packet error rate (e.g., setting the packet error rate equal to the ADU error rate) may result in a relatively higher ADU error rate. It may thus be beneficial to enable devices in the wireless communications system 200 to signal and determine QoS based on ADUs 220 rather than packets to improve communications reliability. For example, if a scheduling entity (e.g., the base station 105-a) is enabled to account for attributes of the ADUs 220, the scheduling entity may stop scheduling bits of an ADU 220 if previous bits have failed. Additionally or alternatively, the scheduling entity may allocate a higher modulation and coding scheme (MCS) for remaining bits of an ADU 220 when transmission of the ADU 220 is close to a deadline (e.g., the end of an ADU delay budget).

In some examples, the base station 105-a or the UE 115-a may transmit a set of SDUs 230 (e.g., SDU 230-a, SDU 230-b, SDU 230-c, SDU 230-d) of an ADU 220 via the channel 215. For example, the UE 115-a may receive at least some SDUs 230 of the set of SDUs 230 from the base station 105-a in a downlink transmission. The UE 115-a may identify that the SDUs 230 are included in the ADU 220 based on a header of the SDUs 230. In some examples, the UE 115-a may identify that an SDU 230 is absent from the set of SDUs 230. For example, the UE 115-a may identify that the SDU 230-c is absent based on receiving an SDU 230 corresponding to a subsequent ADU 220. Based on identifying that the SDU 230-c is absent, the UE 115-a may transmit a signal 225 associated with the SDU 230-c. For example, the UE 115-a may proactively request retransmission of the SDU 230-c, or transmit a status (e.g., a PDCP status) indicating the SDU 230-c.

In some examples, the UE 115-a may determine a strategy for discarding SDUs 230 to reduce latency or signaling overhead, for example, based on an ADU content policy. For example, if the ADU content policy indicates that x=100%, where 100% of the bits of the ADU 220 are to be delivered, then if any SDU 230 of the ADU 220 is absent, the UE 115-a may discard the other SDUs 230 (e.g., SDUs 230-a, 230-b, and 230-d) of the ADU 220. Alternatively, if the ADU content policy indicates x<100%, then the UE 115-a may discard the other SDUs 230 of the ADU 220 if the percentage of absent SDUs 230 exceeds 100%−x.

In some examples, the UE 115-a may transmit the set of SDUs 230 to the base station 105-a in an uplink transmission. The UE 115-a may identify that the SDUs 230 are included in the ADU 220, for example, based on an interface with an application client associated with the ADU 220. The UE 115-a may infer that the SDU 230-c is to be retransmitted, and proactively retransmit the SDU 230-c, for example, to satisfy an ADU delay budget.

In some examples, a CU 160-a of the base station 105-a may indicate an ADU 220 to a DU 165-a via a user plane interface (e.g., an F1-U interface 205). For example, the CU 160-a may transmit an ADU indication 210 via the F1-U interface 205, where the ADU indication 210 may identify the ADU 220 and the associated SDUs 230. In some examples, the CU 160-a may additionally transmit a control signal scheduling transmission of the SDUs 230.

In some examples, a DU 165-a of the base station 105-a may handle an absent SDU 230 of an ADU 220 similar to the UE 115-a. For example, the DU 165-a may transmit the set of SDUs 230 to the UE 115-a in a downlink transmission. The DU 165-a may identify that the SDUs 230 are included in the ADU 220 based on a header of the SDUs 230, or based on the ADU indication 210 received via the F1-U interface 205. The DU 165-a may infer that the SDU 230-c is to be retransmitted, and proactively retransmit the SDU 230-c, for example, to satisfy an ADU delay budget. In some examples, the DU 165-a may ensure that SDUs 230 of the ADU 220 are delivered up to a level specified by the ADU content policy by scheduling transmissions at the MAC layer. For example, the DU 165-a may prioritize delivery of remaining SDUs 230 of the ADU 220 if some SDUs 230 have been delivered. In some examples, the DU 165-a may select one or more component carriers in a carrier aggregation scheme for duplicated SDUs 230 of the ADU 220 to ensure that SDUs 230 of the ADU 220 are delivered up to a level specified by the ADU content policy.

In some examples, the DU 165-a may receive the set of SDUs 230 in an uplink transmission. The DU 165-a may identify that the SDUs 230 are included in the ADU 220, for example, based on an interface with an application client associated with the ADU 220. In some examples, the DU 165-a may identify that the SDU 230-c is absent based on receiving an SDU 230 corresponding to a subsequent ADU 220. Based on identifying that the SDU 230-c is absent, the DU 165-a may transmit a signal 225 associated with the SDU 230-c, for example, to request retransmission of the SDU 230-c.

In some examples, the CU 160-a may identify that SDUs 230 are included in an ADU 220 based on a header of a user plane interface (e.g., an S1-U interface). The CU 160-a may infer that one or more SDUs 230 are to be duplicated in a downlink transmission of the ADU 220, for example, based on a quantity of UEs 115 in the wireless communications system 200, an ADU error rate, an ADU content policy, or any combination thereof. Additionally or alternatively, the CU 160-a may determine a strategy for discarding SDUs 230 to reduce latency or signaling overhead, for example, based on the ADU content policy. In some examples, the CU 160-a may proactively transmit a status update (e.g., in the signal 225) based on identifying the SDU 230-c is absent from an uplink transmission.

Figure 3:
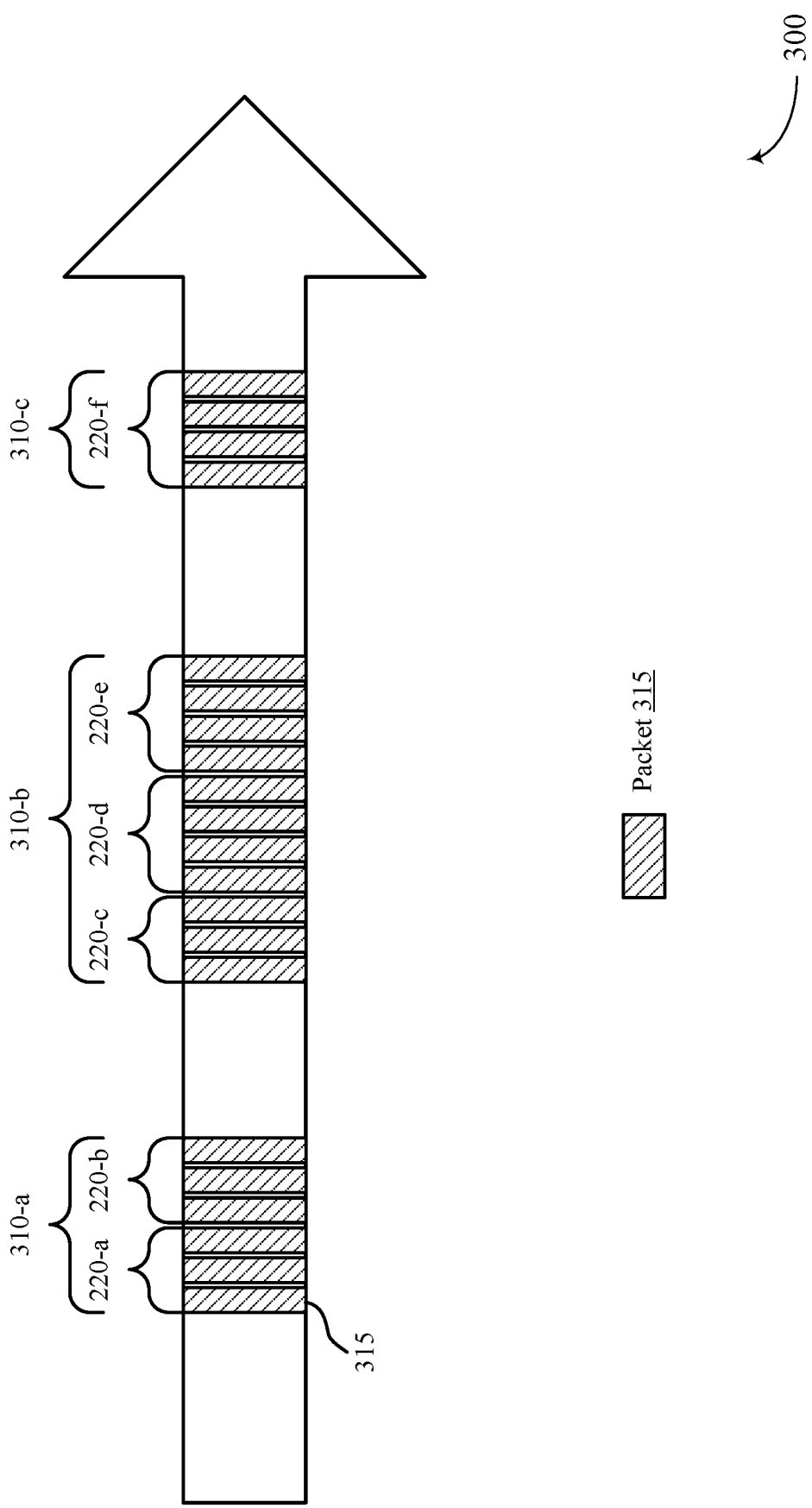
FIG. 3 illustrates an example of a traffic flow that supports techniques for ADU signaling in accordance with aspects of the present disclosure.

FIG. 3 illustrates an example of a traffic flow 300 that supports techniques for ADU signaling in accordance with aspects of the present disclosure. In some examples, the traffic flow 300 may implement aspects of wireless communications systems 100 and 200. For example, the traffic flow 300 may illustrate communications of ADUs 220 between a base station and a UE, which may be examples of the corresponding devices described with reference to FIGS. 1 and 2. The traffic flow 300 may include features for improved QoS for communications between the UE and the base station, among other benefits.

The traffic flow 300 may illustrate transmissions of packets 315 (e.g., IP packets), which may be included in ADUs 220. For example, each ADU 220 (e.g., ADU 220-*a*, ADU 220-*b*, ADU 220-*c*, ADU 220-*d*, ADU 220-*e*, ADU 220-*e*, and ADU 220-*f*) may include tens or hundreds of packets 315 to be processed jointly by an application at the UE or at the base station. The ADUs 220 may be transmitted in bursts 310 (e.g., burst 310-*a*, burst 310-*b*, burst 310-*c*, and so forth), where each burst 310 may include data concurrently generated by an application (e.g., one video frame per burst 310, where each ADU 220 may include a portion of the video frame).

As described herein, devices may communicate using the traffic flow 300 based on a shared ADU awareness. In one example, a UE may communicate (e.g., receive in a downlink communication or transmit in an uplink communication) a set of SDUs of an ADU 220. The UE may be aware of the ADU 220 that includes the set of SDUs based on an identifier in a header of the set of SDUs. The UE may determine that an SDU (e.g., including one or more packets 315) of the ADU 220 is absent, for example, based on receiving an SDU corresponding to a subsequent ADU 220. In the case of downlink, the UE may proactively request retransmission of the absent SDU, or transmit a status indicating the absent SDU. In the case of uplink, the UE may proactively retransmit the absent SDU, for example, to satisfy an ADU delay budget. In a second example, a DU of a base station may handle an absent SDU similar to the UE. For example, in the case of uplink, the DU may proactively request retransmission of the absent SDU, or transmit a status indicating the absent SDU. In the case of downlink, the DU may proactively retransmit the absent SDU, for example, based on an ADU content policy. Additionally or alternatively, the DU may select a component carrier in a carrier aggregation scheme for retransmitting the SDU based on the ADU content policy.

Figure 4:
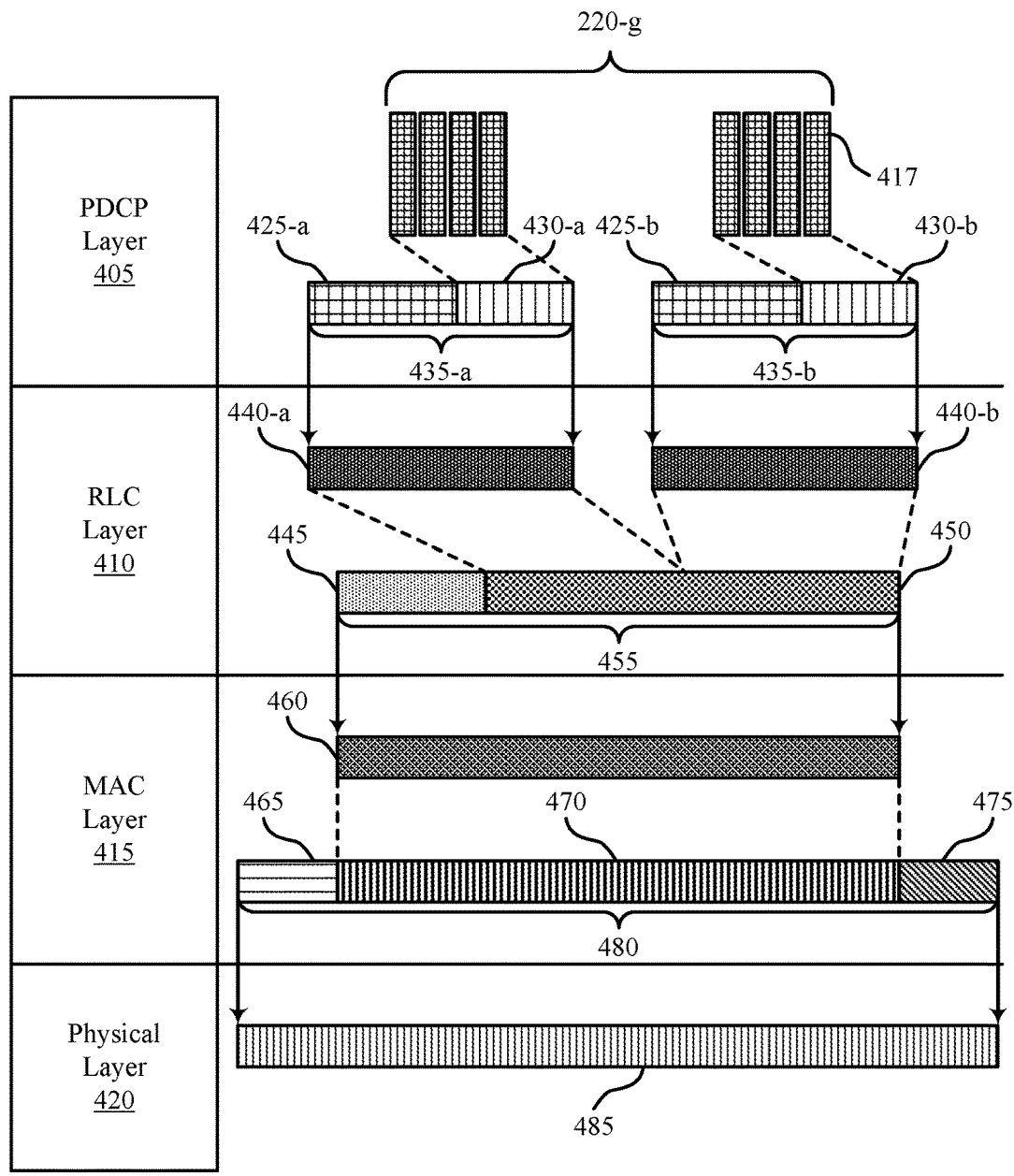
FIG. 4 illustrates an example of a protocol stack that supports techniques for ADU signaling in accordance with aspects of the present disclosure.
Figure 4:
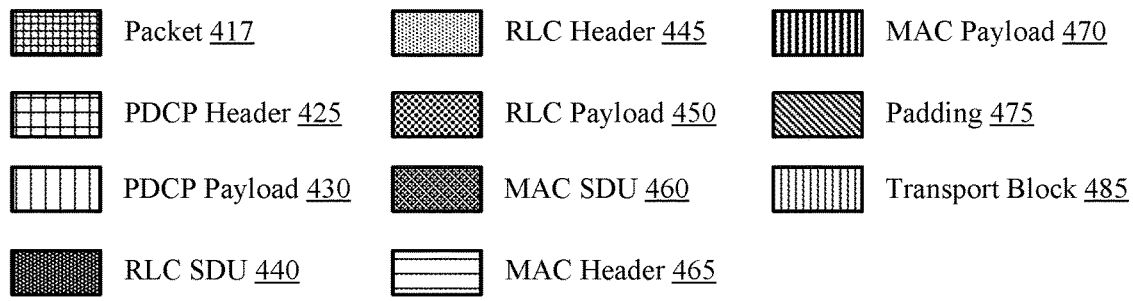

FIG. 4 illustrates an example of a protocol stack 400 that supports techniques for ADU signaling in accordance with aspects of the present disclosure. In some examples, the protocol stack 400 may implement aspects of wireless communications systems 100 and 200. For example, the protocol stack 400 may be included at a base station and a UE, which may be examples of the corresponding devices described with reference to FIGS. 1 and 2. The protocol stack 400 may include features for improved QoS for communications between the UE and the base station, among other benefits.

As illustrated in FIG. 4, the protocol stack 400 may include a PDCP layer 405, an RLC layer 410, a MAC layer 415, and a physical layer 420. Packets 417 of an ADU 220-*g* (which may be an example of the packets 315 described with reference to FIG. 3) may be SDUs at the PDCP layer 405. The PDCP layer 405 may include the SDUs in PDCP payloads 430-*a* and 430-*b* and add corresponding PDCP headers 425-*a* and 425-*b* to form PDCP protocol data units (PDUs) 435-*a* and 435-*b*. In some examples, the PDCP headers 425 may include an indication that identifies the PDCP SDUs are associated with the ADU 220-*g*.

The PDCP layer 405 may provide the PDCP PDUs 435-*a* and 435-*b* to the RLC layer 410 as RLC SDUs 440-*a* and 440-*b*. The RLC layer 410 may include the RLC SDUs 440-*a* and 440-*b* in an RLC payload 450 and add an RLC header 445 to form an RLC PDU 455. In some examples, the RLC header 445 may include an indication that identifies the RLC SDUs 440-*a* and 440-*b* are associated with the ADU 220-*g*.

The RLC layer 410 may provide the RLC PDU 455 to the MAC layer 415 as a MAC SDU 460. The MAC layer 415 may include the MAC SDU 460 in a MAC payload 470 and add a MAC header 465 and padding 475 to form a MAC PDU 480. The MAC PDU 480 may be provided to the physical layer 420, where the physical layer 420 may transmit the MAC PDU 480 in a transport block 485.

As described herein, devices may communicate using the protocol stack 400 based on a shared awareness of the ADU 220-*g*. In one example, a UE may communicate (e.g., receive in a downlink communication or transmit in an uplink communication) a set of SDUs (e.g., PDCP SDUs or RLC SDUs 440) of an ADU 220. The UE may be aware of the ADU 220-*g* that includes the set of SDUs based on an identifier in a header (e.g., a PDCP header 425 or an RLC header 445) of the set of SDUs. The UE may determine that an SDU (e.g., including one or more packets 417) of the ADU 220-*g* is absent, for example, based on receiving an SDU corresponding to a subsequent ADU 220-*g*. In the case of downlink, the UE may proactively request retransmission of the absent SDU, or transmit a status indicating the absent SDU. In the case of uplink, the UE may proactively retransmit the absent SDU, for example, to satisfy an ADU delay budget. In a second example, a DU of a base station may handle an absent SDU similar to the UE. For example, in the case of uplink, the DU may proactively request retransmission of the absent SDU, or transmit a status indicating the absent SDU. In the case of downlink, the DU may proactively retransmit the absent SDU, for example, based on an ADU content policy. Additionally or alternatively, the DU may select a component carrier in a carrier aggregation scheme for retransmitting the SDU based on the ADU content policy.

Figure 5:
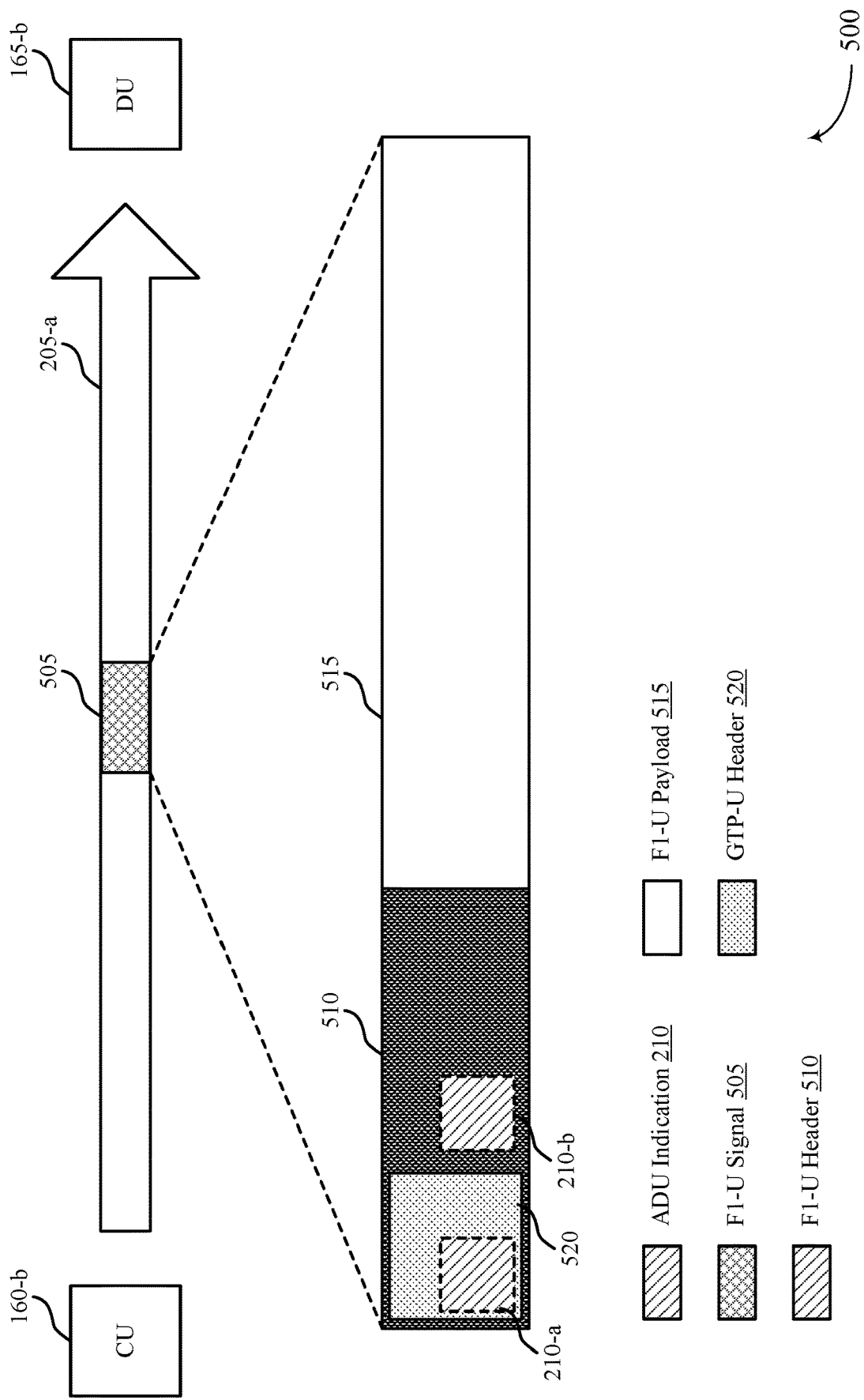
FIG. 5 illustrates an example of a wireless communications system that supports techniques for ADU signaling in accordance with aspects of the present disclosure.

FIG. 5 illustrates an example of a wireless communications system 500 that supports techniques for ADU signaling in accordance with aspects of the present disclosure. In some examples, the wireless communications system 500 may implement aspects of the wireless communications systems 100 and 200. For example, the wireless communications system 500 may include a CU 160-*b* and a DU 165-*b*, which may be examples of the corresponding devices described with reference to FIGS. 1 and 2. The wireless communications system 500 may include features for improved QoS for communications between the CU 160-*b* and the DU 165-*b*, among other benefits.

In some examples, the CU 160-*b* may indicate an ADU to the DU 165-*b* via a user plane interface (e.g., an F1-U interface 205-*a*). For example, the CU 160-*b* may transmit an ADU indication 210 via the F1-U interface 205-*a*, where the ADU indication 210 may identify the ADU and associated SDUs. The CU 160-*b* may transmit an F1-U signal 505 to the DU 165-*b* via the F1-U interface 205-*a*. The F1-U signal 505 may include an F1-U header 510 and an F1-U payload 515. The F1-U header may further include a general packet radio service (GPRS) tunnelling protocol user (GTP-U) header 520. In some examples, the CU 160-*b* may include an ADU indication 210-*a* in the GTP-U header 520 or an ADU indication 210-*b* outside the GTP-U header 520 to indicate that data in the F1-U payload 515 is associated with an ADU. For example, the ADU indication 210 may include bits identifying the ADU associated with the F1-U payload 515. Additionally or alternatively, the ADU indication 210 may include a single bit that indicates the F1-U payload 515 belongs to a new ADU.

Figure 6:
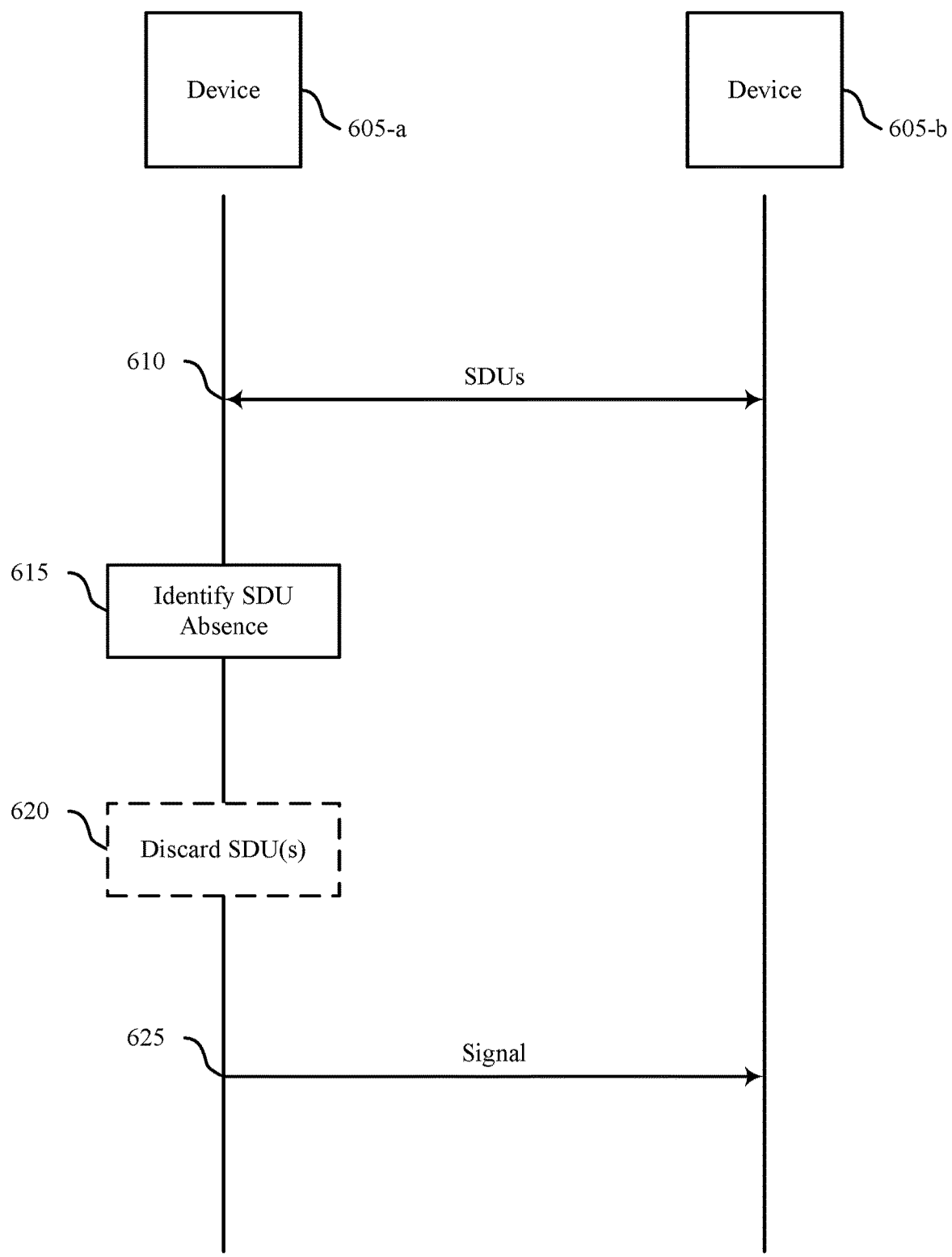
FIG. 6 illustrates an example of a process flow in a system that supports techniques for ADU signaling in accordance with aspects of the present disclosure.

FIG. 6 illustrates an example of a process flow 600 in a system that supports techniques for ADU signaling in accordance with aspects of the present disclosure. In some examples, the process flow 600 may implement aspects of wireless communications systems 100 and 200. For example, the process flow 600 may include example operations associated with one or more devices 605 (e.g., device 605-a, device 605-b), each which may be an example of a base station 105 or a UE 115 described with reference to FIGS. 1 and 2. In the following description of the process flow 600, the operations between the devices 605 may be performed in a different order than the example order shown, or the operations performed by the devices 605 may be performed in different orders or at different times. Some operations may also be omitted from the process flow 600, and other operations may be added to the process flow 600. The operations performed by the devices 605 may support improvement to QoS operations at the devices 605 and, in some examples, may promote improvements to efficiency and reliability for communications between the devices 605, among other benefits.

At 610, the device 605-a may communicate (e.g., transmit or receive) a set of SDUs of an ADU with the device 605-b. For example, if the device 605-a is a UE, the device 605-a may receive the set of SDUs in a downlink communication or transmit the set of SDUs in an uplink communication. If the device 605-a is a base station (e.g., a DU of a base station), the device 605-a may receive the set of SDUs in an uplink communication or transmit the set of SDUs in a downlink communication. In some examples, the device 605-a may identify the ADU that includes the set of SDUs based on an identifier in a header of the set of SDUs, or based on an interface with an application client associated with the ADU, or based on an ADU indication received via a user plane interface (e.g., an F1-U interface between a DU and a CU).

At 615, the device 605-a may identify an absence of an SDU of the set of SDUs. For example, the device 605-a may identify that the SDU is absent based on receiving an SDU corresponding to a subsequent ADU. Additionally or alternatively, the device 605-a may infer that the absent SDU is to be retransmitted to the device 605-b.

In some examples, at 620, the device 605-a may discard one or more SDUs of the ADU to reduce latency or signaling overhead, for example, based on an ADU content policy.

At 625, the device 605-a may transmit a signal to the device 605-b based on identifying that the SDU is absent. For example, the device 605-a may proactively request retransmission of the absent SDU, or transmit a status (e.g., a PDCP status) indicating the absent SDU. Alternatively, the device 605-a may proactively retransmit the absent SDU, for example, to satisfy an ADU delay budget. By implementing one or more of the described techniques, the devices 605 may be able to communicate using ADUs more efficiently, or in a manner that increases transmission reliability, or considers power consumption or processing load, among other benefits.

Figure 7:
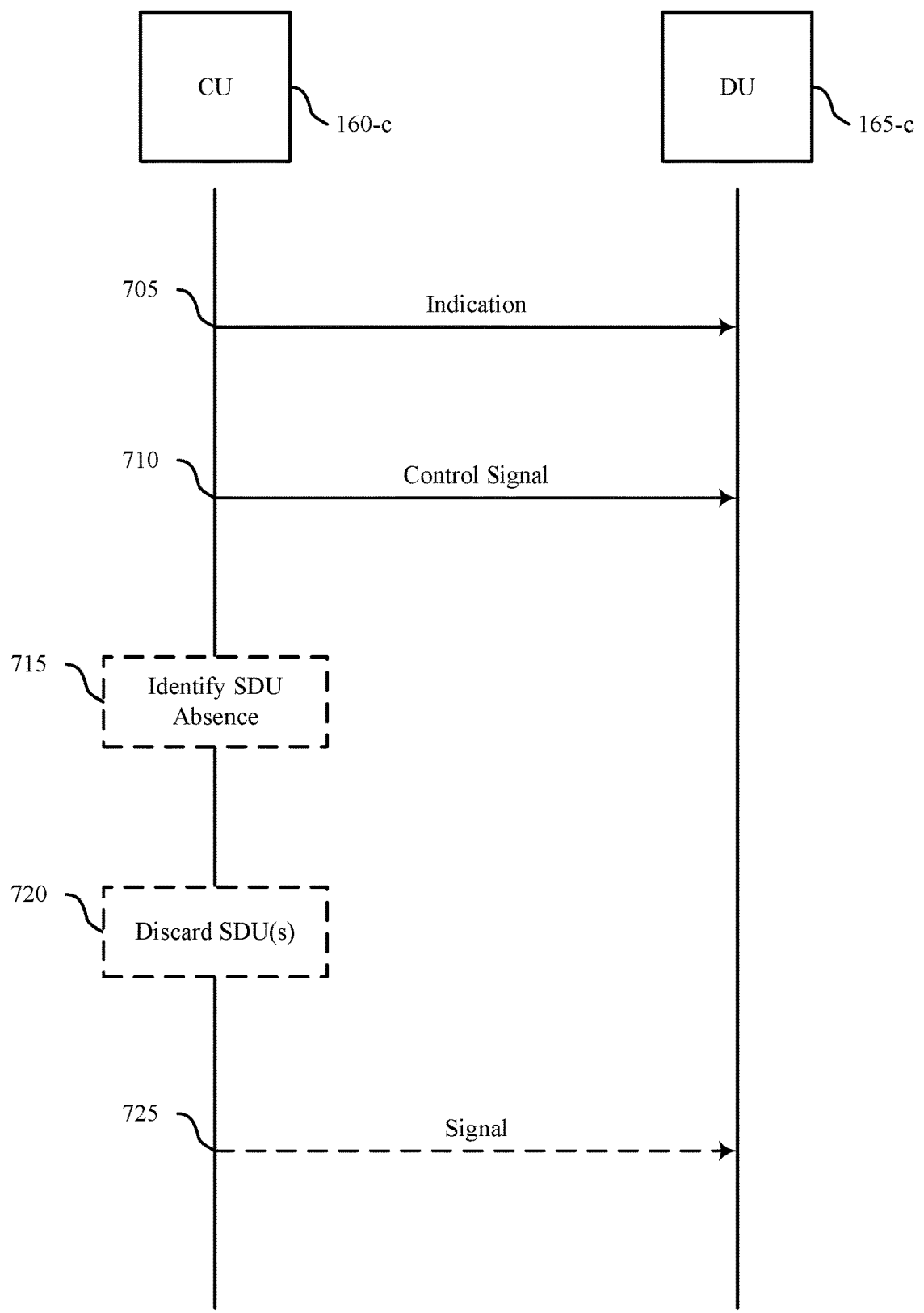
FIG. 7 illustrates an example of a process flow in a system that supports techniques for ADU signaling in accordance with aspects of the present disclosure.

FIG. 7 illustrates an example of a process flow 700 in a system that supports techniques for ADU signaling in accordance with aspects of the present disclosure. In some examples, the process flow 700 may implement aspects of wireless communications systems 100, 200, and 500. For example, the process flow 700 may include example operations associated with one or more of a CU 160-c or a DU 165-c, which may be examples of the corresponding devices described with reference to FIGS. 1, 2, and 5. In the following description of the process flow 700, the operations between the CU 160-c and the DU 165-c may be performed in a different order than the example order shown, or the operations performed by the CU 160-c and the DU 165-c may be performed in different orders or at different times. Some operations may also be omitted from the process flow 700, and other operations may be added to the process flow 700. The operations performed by the CU 160-c and the DU 165-c may support improvement to QoS operations at the CU 160-c and the DU 165-c and, in some examples, may promote improvements to efficiency and reliability for communications between the CU 160-c and the DU 165-c, among other benefits.

At 705, the CU 160-c may indicate an ADU to the DU 165-c via a user plane interface (e.g., an F1-U interface). For example, the CU 160-c may transmit an ADU indication via the F1-U interface, where the ADU indication may identify the ADU and associated SDUs. The CU 160-c may include the ADU indication in an F1-U header, inside or outside a GTP-U header. For example, the ADU indication may include bits identifying the ADU associated with a F1-U payload. Additionally or alternatively, the ADU indication may include a single bit that indicates the F1-U payload belongs to a new ADU.

At 710, the CU 160-c may transmit a control signal to the DU 165-c scheduling a transmission of a set of SDUs associated with the ADU. In some examples, the CU 160-c may identify that SDUs are included in an ADU based on a header of a user plane interface (e.g., an S1-U interface).

In some examples, at 715, the CU 160-c may identify an absence of an SDU of the set of SDUs. For example, the CU 160-c may infer that one or more SDUs are to be duplicated in a downlink transmission of the ADU, for example, based on a quantity of UEs in a wireless communications system, an ADU error rate, an ADU content policy, or any combination thereof.

In some examples, at 720, the CU 160-c may determine a strategy for discarding SDUs to reduce latency or signaling overhead, for example, based on the ADU content policy.

In some examples, at 725, the CU 160-c may proactively transmit a signal (e.g., a status update) based on identifying the absent SDU. By implementing one or more of the described techniques, the CU 160-c and DU 165-c may be able to effectively signal the association between the ADU and the SDUs, and communicate using ADUs more efficiently, or in a manner that increases transmission reliability, or considers power consumption or processing load, among other benefits.

Figure 8:
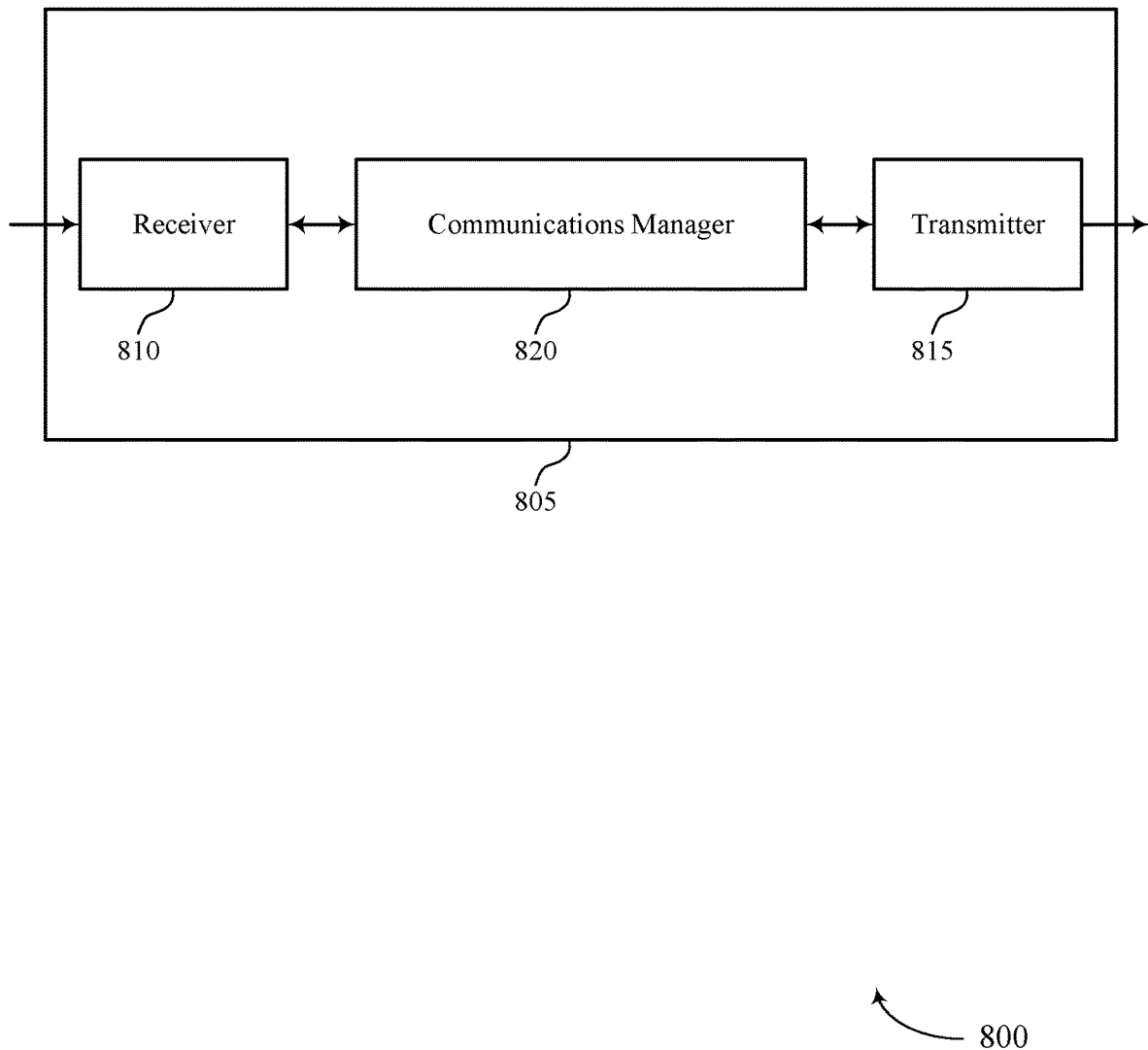
FIGS. 8 and 9 show block diagrams of devices that support techniques for ADU signaling in accordance with aspects of the present disclosure.

FIG. 8 shows a block diagram 800 of a device 805 that supports techniques for ADU signaling in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for ADU signaling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for ADU signaling). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for ADU signaling as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for communicating a set of SDUs with a base station, a correspondence between the set of SDUs and an ADU being indicated by at least one header of the set of SDUs. The communications manager 820 may be configured as or otherwise support a means for identifying an absence of an SDU of the set of SDUs. The communications manager 820 may be configured as or otherwise support a means for transmitting, to the base station, a signal associated with the SDU based on identifying the absence of the SDU, the signal proactively indicating information associated with the ADU to the base station.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved ADU processing, reduced power consumption, more efficient utilization of communication resources, or improved QoS.

Figure 9:
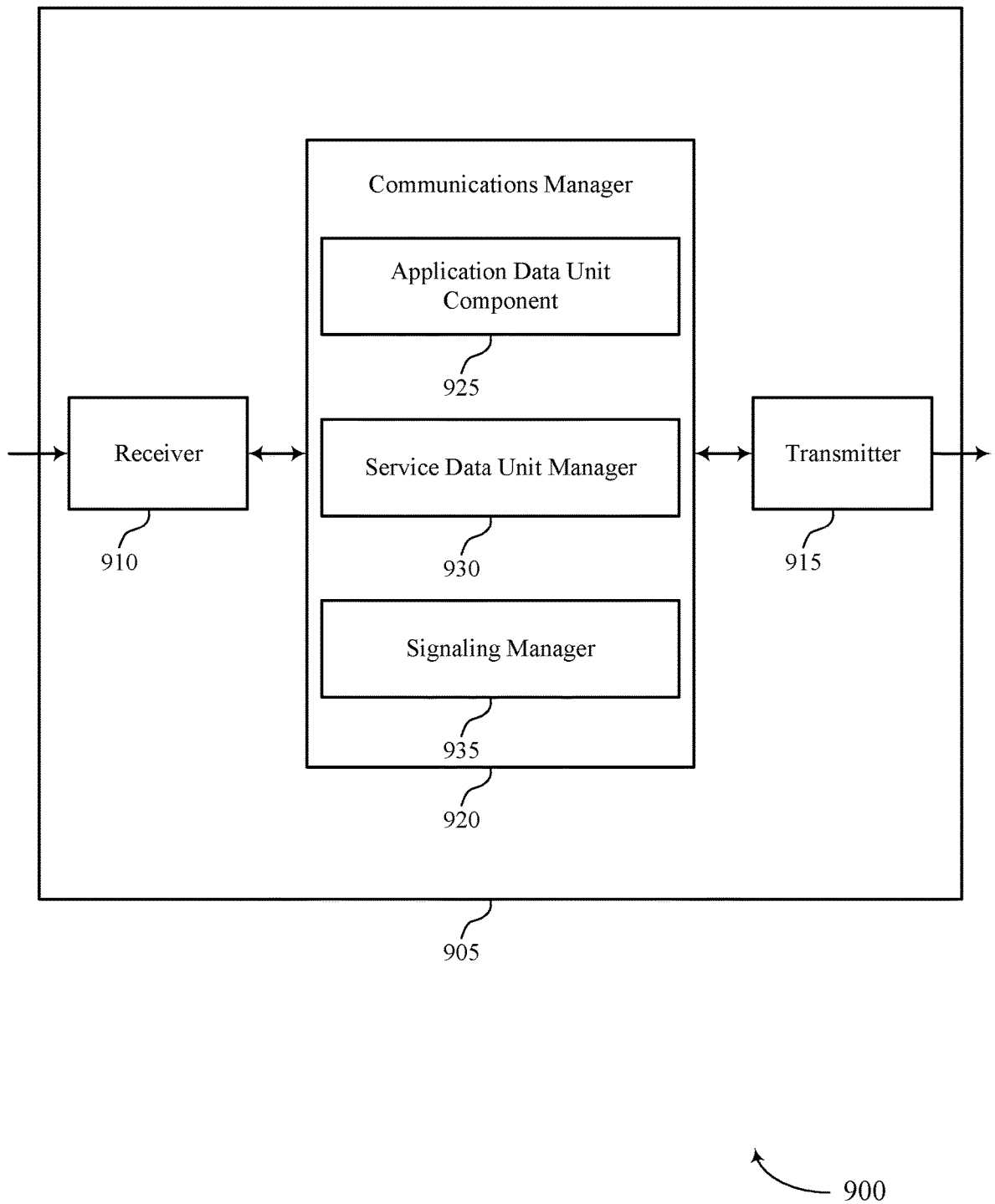

FIG. 9 shows a block diagram 900 of a device 905 that supports techniques for ADU signaling in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for ADU signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for ADU signaling). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for ADU signaling as described herein. For example, the communications manager 920 may include an application data unit component 925, a service data unit manager 930, a signaling manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The application data unit component 925 may be configured as or otherwise support a means for communicating a set of SDUs with a base station, a correspondence between the set of SDUs and an ADU being indicated by at least one header of the set of SDUs. The service data unit manager 930 may be configured as or otherwise support a means for identifying an absence of an SDU of the set of SDUs. The signaling manager 935 may be configured as or otherwise support a means for transmitting, to the base station, a signal associated with the SDU based on identifying the absence of the SDU, the signal proactively indicating information associated with the ADU to the base station.

Figure 10:
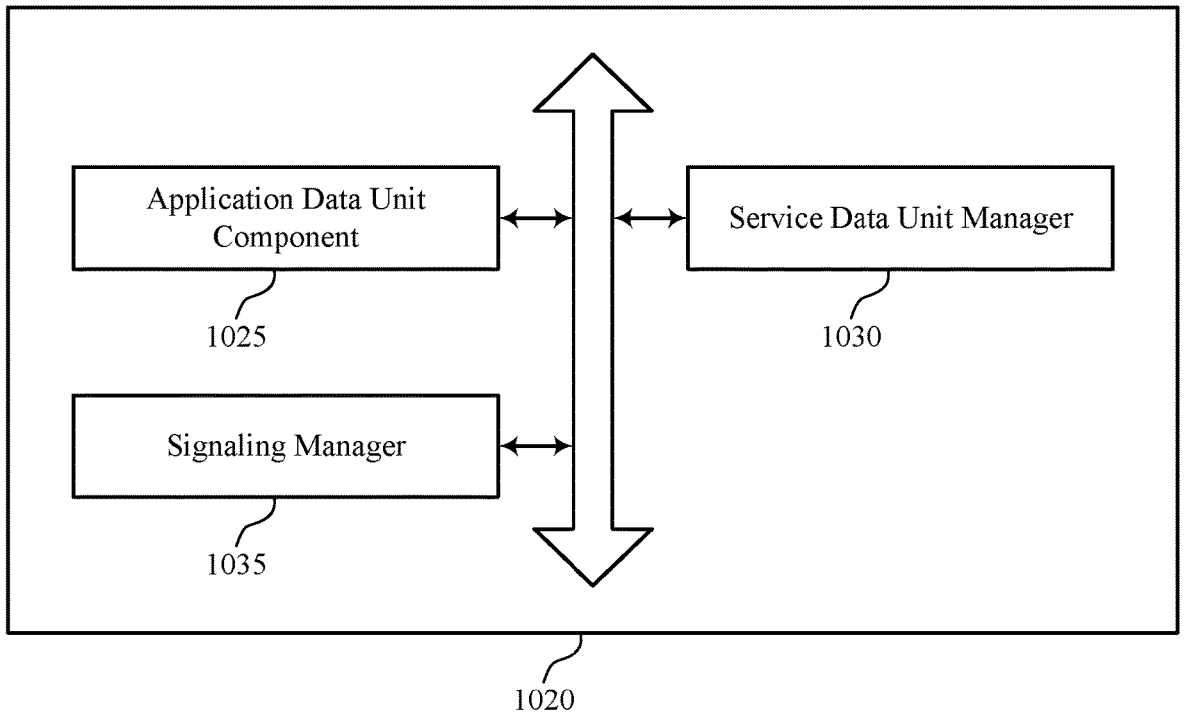
FIG. 10 shows a block diagram of a communications manager that supports techniques for ADU signaling in accordance with aspects of the present disclosure.

FIG. 10 shows a block diagram 1000 of a communications manager 1020 that supports techniques for ADU signaling in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for ADU signaling as described herein. For example, the communications manager 1020 may include an application data unit component 1025, a service data unit manager 1030, a signaling manager 1035, or any combination thereof. Each of these components may communicate, directly or indirectly, with one another (e.g., via one or more buses).

The communications manager 1020 may support wireless communication at a UE in accordance with examples as disclosed herein. The application data unit component 1025 may be configured as or otherwise support a means for communicating a set of SDUs with a base station, a correspondence between the set of SDUs and an ADU being indicated by at least one header of the set of SDUs. The service data unit manager 1030 may be configured as or otherwise support a means for identifying an absence of an SDU of the set of SDUs. The signaling manager 1035 may be configured as or otherwise support a means for transmitting, to the base station, a signal associated with the SDU based on identifying the absence of the SDU, the signal proactively indicating information associated with the ADU to the base station.

In some examples, to support transmitting the signal, the signaling manager 1035 may be configured as or otherwise support a means for transmitting a request for a retransmission of the SDU, where the signal includes the request for the retransmission.

In some examples, to support transmitting the signal, the signaling manager 1035 may be configured as or otherwise support a means for transmitting an indication of a status associated with the SDU, where the signal includes the indication.

In some examples, the status includes a PDCP status.

In some examples, to support transmitting the signal, the signaling manager 1035 may be configured as or otherwise support a means for transmitting the SDU in a retransmission.

In some examples, the SDU is transmitted in the retransmission based on a delay budget associated with the ADU.

In some examples, the service data unit manager 1030 may be configured as or otherwise support a means for discarding one or more SDUs of the set of SDUs based on a content policy associated with a reception of a set of bits including the ADU.

In some examples, the one or more discarded SDUs include the SDU. In some examples, the signal is transmitted based on discarding the one or more SDUs.

In some examples, the absence of the SDU is identified based on a presence of a second SDU corresponding to a second ADU that is scheduled after the ADU. In some examples, the SDU includes a PDCP SDU or an RLC SDU.

Figure 11:
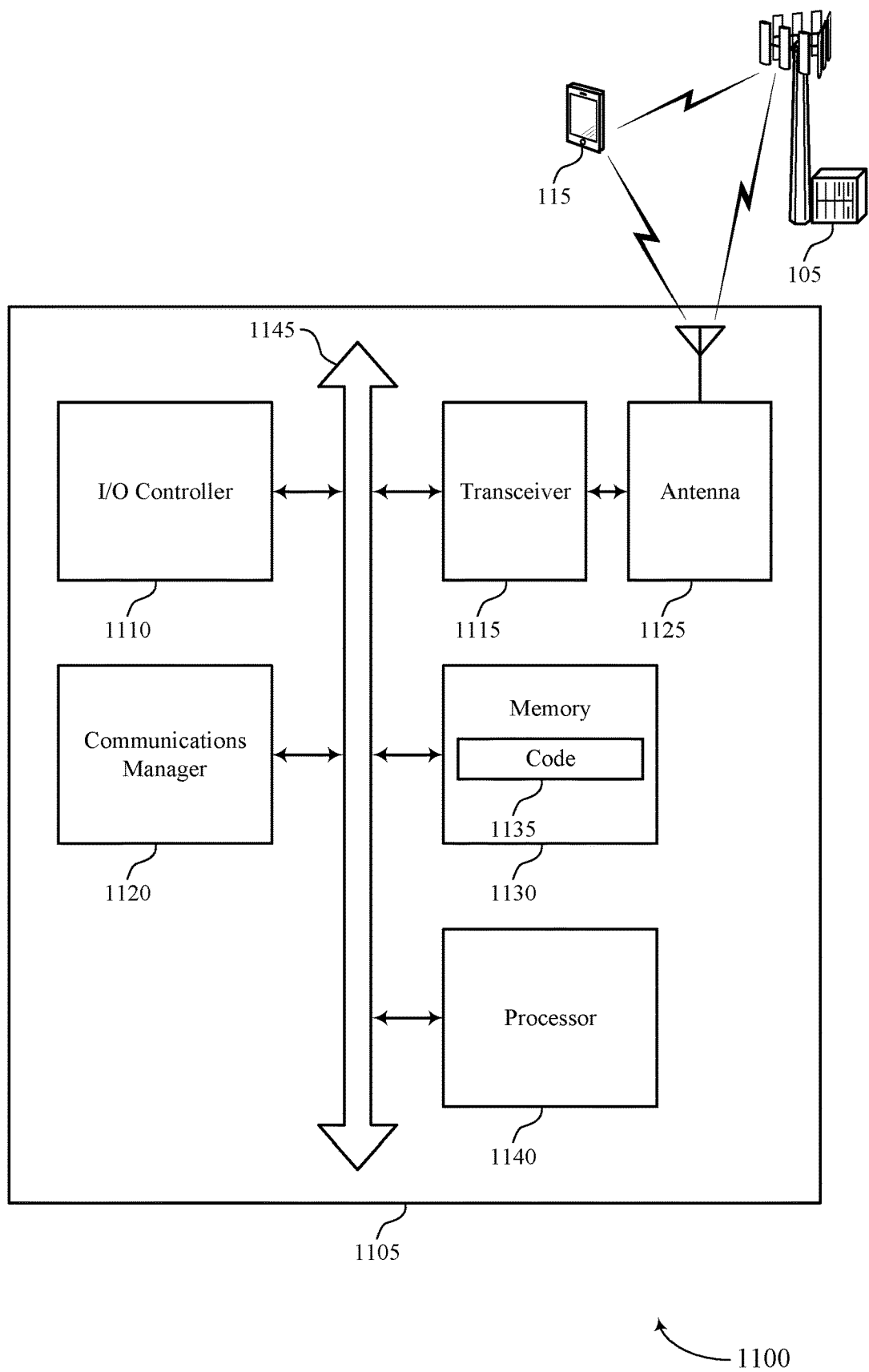
FIG. 11 shows a diagram of a system including a device that supports techniques for ADU signaling in accordance with aspects of the present disclosure.

FIG. 11 shows a diagram of a system 1100 including a device 1105 that supports techniques for ADU signaling in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for ADU signaling). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for communicating a set of SDUs with a base station, a correspondence between the set of SDUs and an ADU being indicated by at least one header of the set of SDUs. The communications manager 1120 may be configured as or otherwise support a means for identifying an absence of an SDU of the set of SDUs. The communications manager 1120 may be configured as or otherwise support a means for transmitting, to the base station, a signal associated with the SDU based on identifying the absence of the SDU, the signal proactively indicating information associated with the ADU to the base station.

By including or configuring the communications manager 1120 in accordance with examples as described herein, the device 1105 may support techniques for improved communication reliability, reduced latency, improved user experience related to improved processing of the ADUs, reduced power consumption, more efficient utilization of communication resources, improved coordination between devices, longer battery life, or improved utilization of processing capability associated with the ADUs.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for ADU signaling as described herein, or the processor 1140 and the memory 1130 may be otherwise configured to perform or support such operations.

Figure 12:
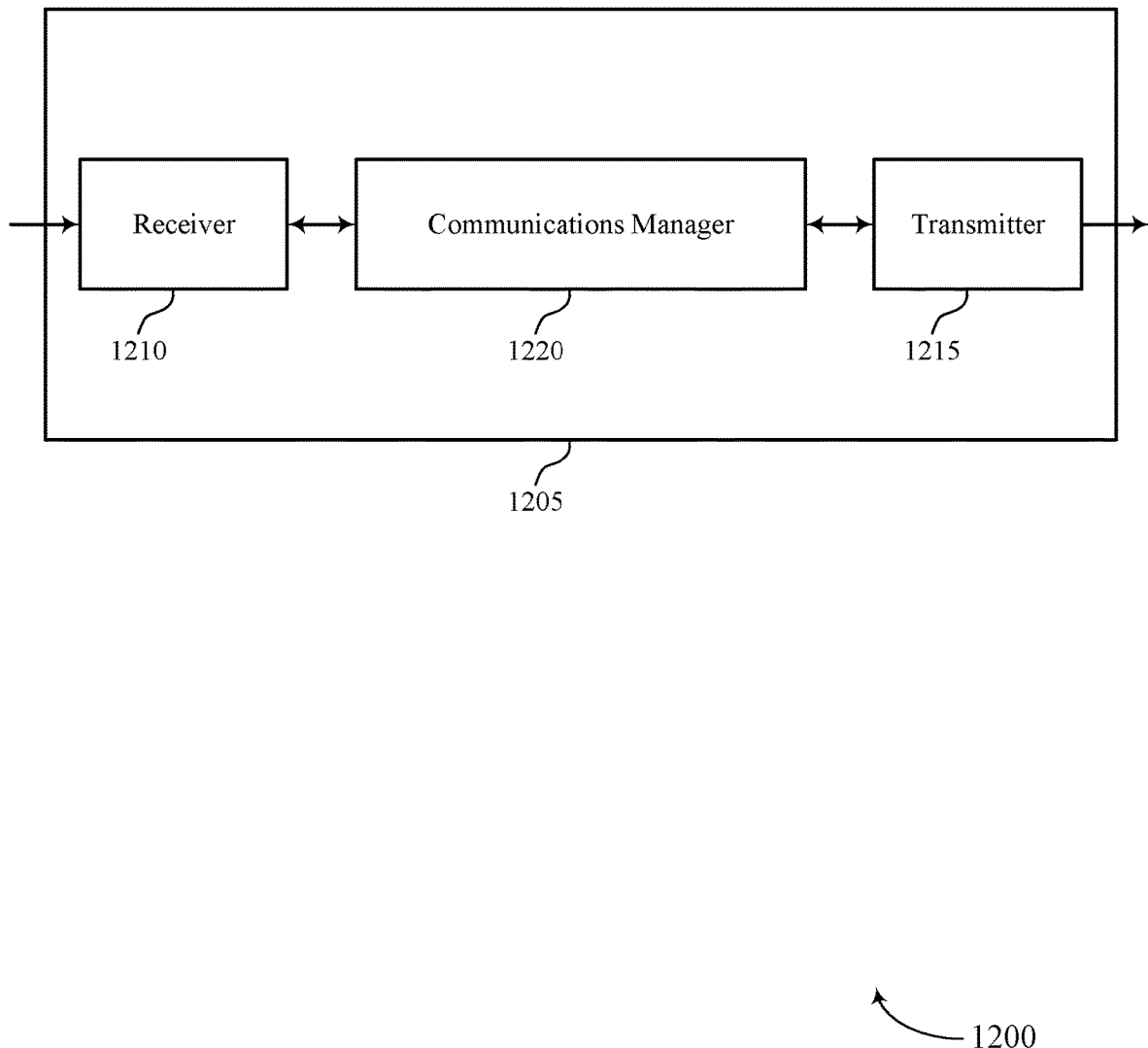
FIGS. 12 and 13 show block diagrams of devices that support techniques for ADU signaling in accordance with aspects of the present disclosure.

FIG. 12 shows a block diagram 1200 of a device 1205 that supports techniques for ADU signaling in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for ADU signaling). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for ADU signaling). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for ADU signaling as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a centralized unit of a base station in accordance with examples as disclosed herein. For example, the communications manager 1220 may be configured as or otherwise support a means for transmitting, via a user plane interface with one or more distributed units of the base station, an indication of an ADU including a set of SDUs, the indication including one or more bits in a header associated with the user plane interface. The communications manager 1220 may be configured as or otherwise support a means for transmitting, based on transmitting the indication, a control signal that schedules a transmission of the set of SDUs corresponding to the ADU.

Additionally or alternatively, the communications manager 1220 may support wireless communication at a base station in accordance with examples as disclosed herein. For example, the communications manager 1220 may be configured as or otherwise support a means for communicating a set of SDUs with a UE, a correspondence between the set of SDUs and an ADU being indicated by at least one header of the set of SDUs. The communications manager 1220 may be configured as or otherwise support a means for identifying an absence of an SDU of the set of SDUs. The communications manager 1220 may be configured as or otherwise support a means for transmitting, to the UE, a signal associated with the SDU based on identifying the absence of the SDU, the signal proactively indicating information associated with the ADU to the UE.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for improved ADU processing, reduced power consumption, more efficient utilization of communication resources, or improved QoS.

Figure 13:
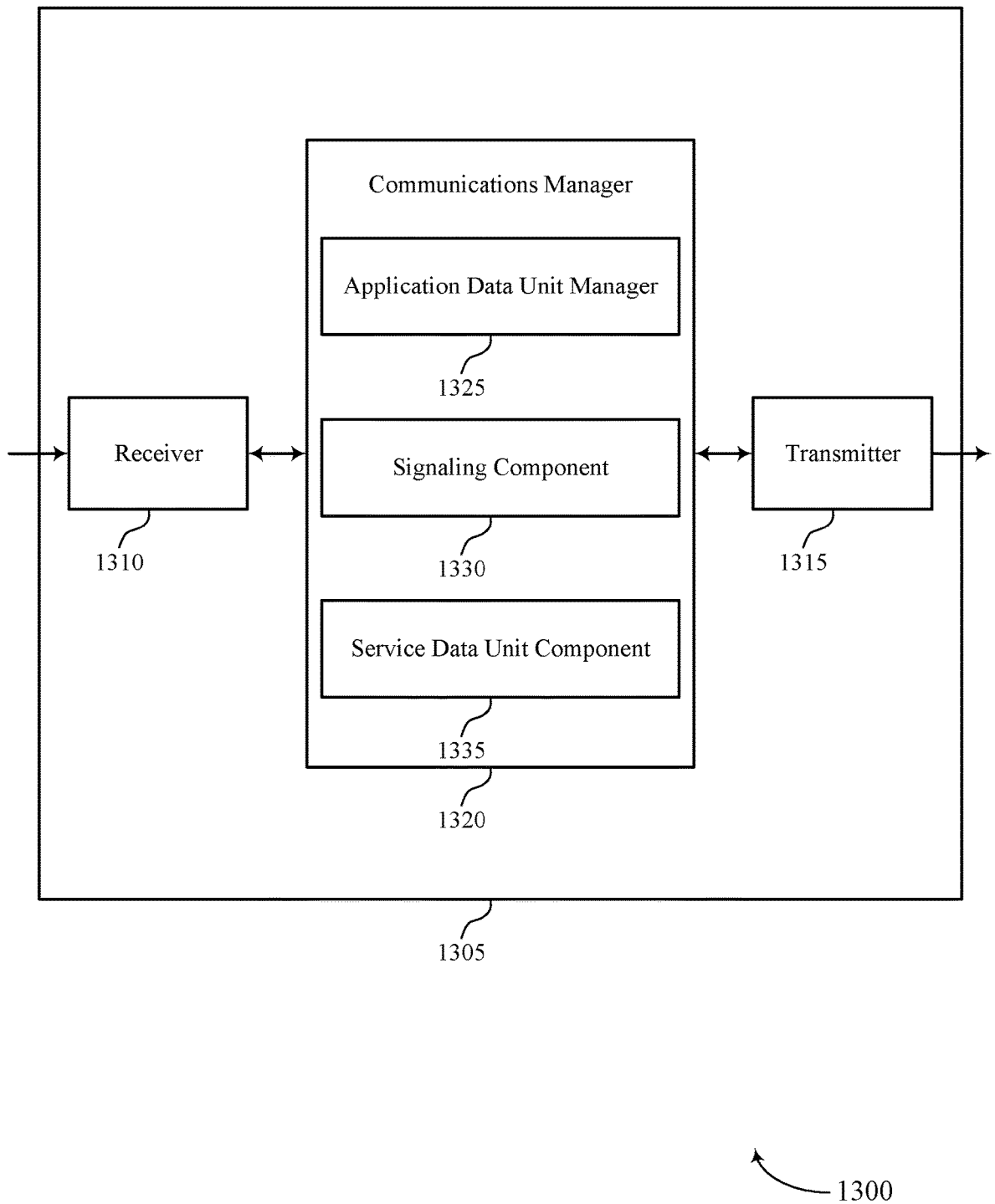

FIG. 13 shows a block diagram 1300 of a device 1305 that supports techniques for ADU signaling in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for ADU signaling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for ADU signaling). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for ADU signaling as described herein. For example, the communications manager 1320 may include an application data unit manager 1325, a signaling component 1330, a service data unit component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a centralized unit of a base station in accordance with examples as disclosed herein. The application data unit manager 1325 may be configured as or otherwise support a means for transmitting, via a user plane interface with one or more distributed units of the base station, an indication of an ADU including a set of SDUs, the indication including one or more bits in a header associated with the user plane interface. The signaling component 1330 may be configured as or otherwise support a means for transmitting, based on transmitting the indication, a control signal that schedules a transmission of the set of SDUs corresponding to the ADU.

Additionally or alternatively, the communications manager 1320 may support wireless communication at a base station in accordance with examples as disclosed herein. The application data unit manager 1325 may be configured as or otherwise support a means for communicating a set of SDUs with a UE, a correspondence between the set of SDUs and an ADU being indicated by at least one header of the set of SDUs. The service data unit component 1335 may be configured as or otherwise support a means for identifying an absence of an SDU of the set of SDUs. The signaling component 1330 may be configured as or otherwise support a means for transmitting, to the UE, a signal associated with the SDU based on identifying the absence of the SDU, the signal proactively indicating information associated with the ADU to the UE.

Figure 14:
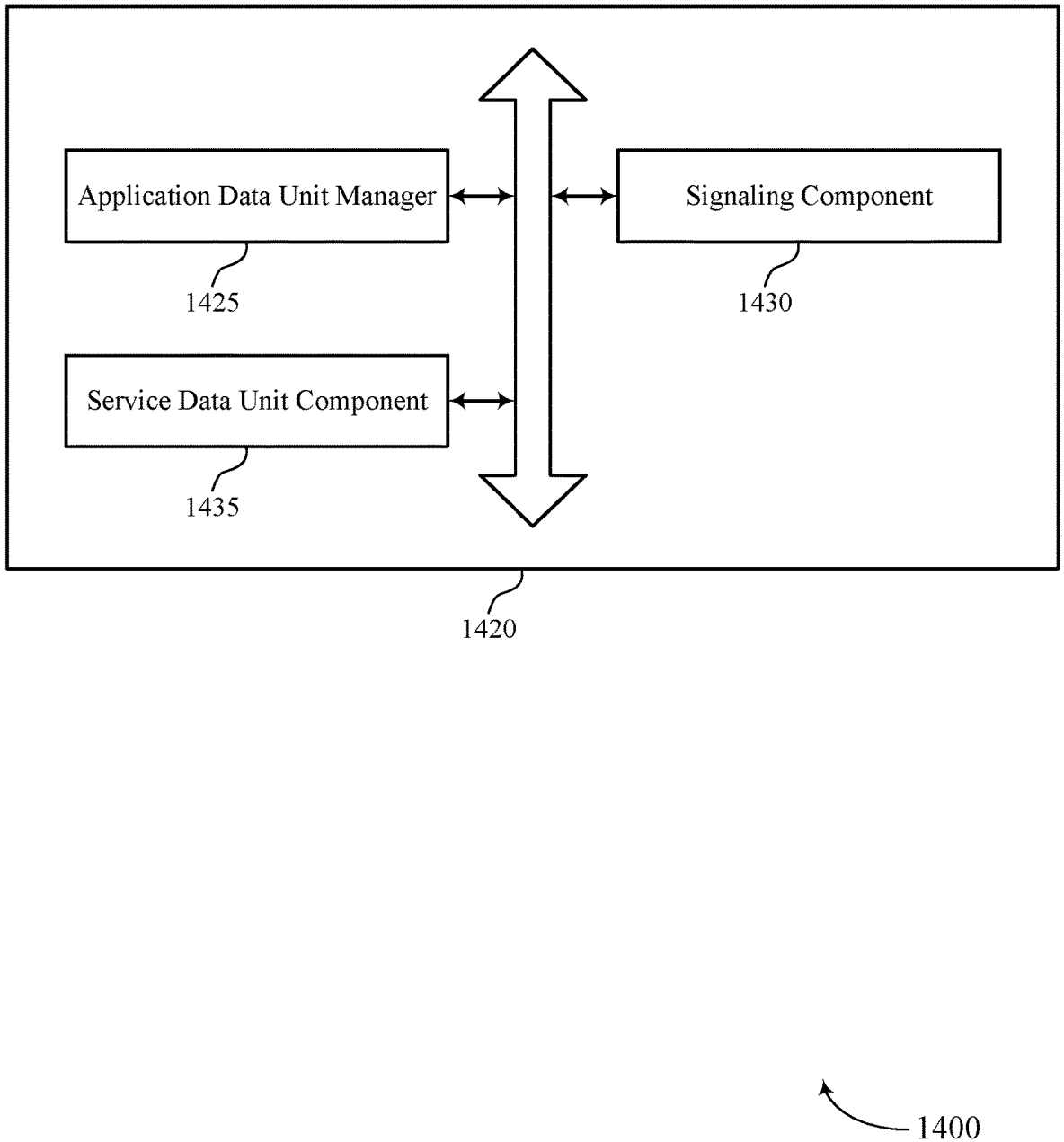
FIG. 14 shows a block diagram of a communications manager that supports techniques for ADU signaling in accordance with aspects of the present disclosure.

FIG. 14 shows a block diagram 1400 of a communications manager 1420 that supports techniques for ADU signaling in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for ADU signaling as described herein. For example, the communications manager 1420 may include an application data unit manager 1425, a signaling component 1430, a service data unit component 1435, or any combination thereof. Each of these components may communicate, directly or indirectly, with one another (e.g., via one or more buses).

The communications manager 1420 may support wireless communication at a centralized unit of a base station in accordance with examples as disclosed herein. The application data unit manager 1425 may be configured as or otherwise support a means for transmitting, via a user plane interface with one or more distributed units of the base station, an indication of an ADU including a set of SDUs, the indication including one or more bits in a header associated with the user plane interface. The signaling component 1430 may be configured as or otherwise support a means for transmitting, based on transmitting the indication, a control signal that schedules a transmission of the set of SDUs corresponding to the ADU.

In some examples, the one or more bits are included in a GTP-U header of the header associated with the user plane interface.

In some examples, the one or more bits are outside a GTP-U header of the header associated with the user plane interface.

In some examples, the one or more bits of the indication include a bit indicating that a payload associated with the header corresponds to the ADU.

In some examples, the service data unit component 1435 may be configured as or otherwise support a means for determining that at least a first header of the set of SDUs and a second header associated with a second user plane interface indicate a correspondence between the set of SDUs and the ADU. In some examples, the service data unit component 1435 may be configured as or otherwise support a means for identifying an absence of an SDU of the set of SDUs. In some examples, the signaling component 1430 may be configured as or otherwise support a means for transmitting a signal associated with the SDU based on identifying the absence of the SDU, the signal proactively indicating information associated with the ADU.

In some examples, to support transmitting the signal, the signaling component 1430 may be configured as or otherwise support a means for transmitting an indication of a status associated with the SDU, where the signal includes the indication.

In some examples, the signal is transmitted based on a quantity of UE in communication with the base station, an error rate associated with the ADU, a content policy associated with a reception of a set of bits including the ADU, or any combination thereof.

In some examples, the service data unit component 1435 may be configured as or otherwise support a means for discarding one or more SDUs of the set of SDUs based on a content policy associated with a reception of a set of bits including the ADU.

In some examples, the one or more discarded SDUs include the SDU. In some examples, the signal is transmitted based on discarding the one or more SDUs.

In some examples, the absence of the SDU is identified based on a presence of a second SDU corresponding to a second ADU that is scheduled after the ADU. In some examples, the SDU includes a PDCP SDU or an RLC SDU.

Additionally or alternatively, the communications manager 1420 may support wireless communication at a base station in accordance with examples as disclosed herein. In some examples, the application data unit manager 1425 may be configured as or otherwise support a means for communicating a set of SDUs with a UE, a correspondence between the set of SDUs and an ADU being indicated by at least one header of the set of SDUs. The service data unit component 1435 may be configured as or otherwise support a means for identifying an absence of an SDU of the set of SDUs. In some examples, the signaling component 1430 may be configured as or otherwise support a means for transmitting, to the UE, a signal associated with the SDU based on identifying the absence of the SDU, the signal proactively indicating information associated with the ADU to the UE.

In some examples, to support transmitting the signal, the signaling component 1430 may be configured as or otherwise support a means for transmitting a request for a retransmission of the SDU, where the signal includes the request for the retransmission.

In some examples, to support transmitting the signal, the signaling component 1430 may be configured as or otherwise support a means for transmitting an indication of a status associated with the SDU, where the signal includes the indication. In some examples, the status includes a PDCP status.

In some examples, to support transmitting the signal, the signaling component 1430 may be configured as or otherwise support a means for transmitting the SDU in a retransmission.

In some examples, the SDU is transmitted in the retransmission based on a delay budget associated with the ADU.

In some examples, the SDU is transmitted via a component carrier in a carrier aggregation configuration. In some examples, the component carrier is selected based on a content policy associated with a reception of a set of bits including the ADU.

In some examples, the service data unit component 1435 may be configured as or otherwise support a means for discarding one or more SDUs of the set of SDUs based on a content policy associated with a reception of a set of bits including the ADU.

In some examples, the one or more discarded SDUs include the SDU. In some examples, the signal is transmitted based on discarding the one or more SDUs.

In some examples, the application data unit manager 1425 may be configured as or otherwise support a means for receiving, via a user plane interface with a centralized unit of the base station, an indication of the ADU including the set of SDUs, the indication including one or more bits in a header associated with the user plane interface. In some examples, the signaling component 1430 may be configured as or otherwise support a means for receiving, based on receiving the indication, a control signal that schedules a transmission of the set of SDUs corresponding to the ADU.

In some examples, the absence of the SDU is identified based on a presence of a second SDU corresponding to a second ADU that is scheduled after the ADU. In some examples, the SDU includes a PDCP SDU or an RLC SDU.

Figure 15:
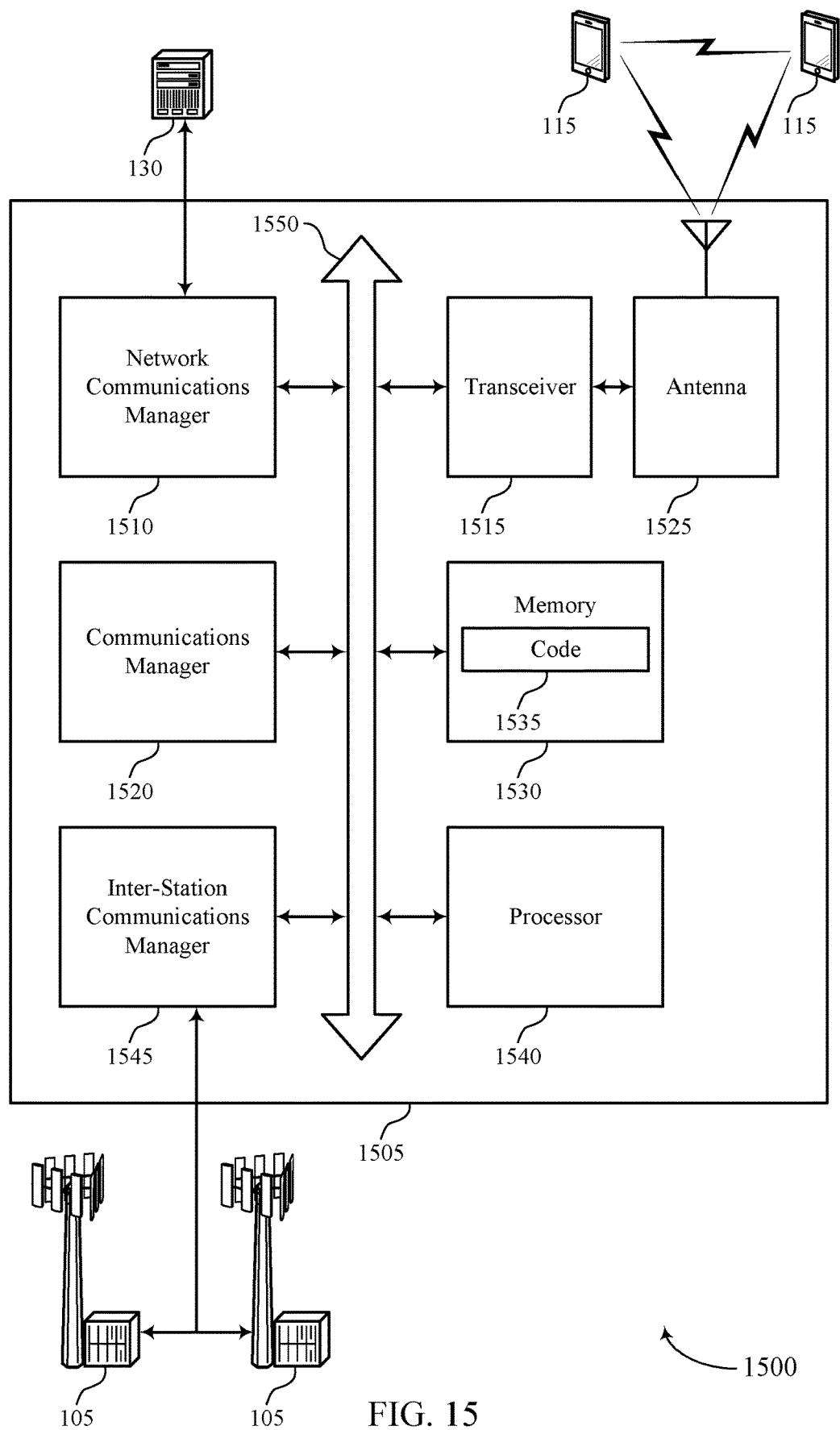
FIG. 15 shows a diagram of a system including a device that supports techniques for ADU signaling in accordance with aspects of the present disclosure.

FIG. 15 shows a diagram of a system 1500 including a device 1505 that supports techniques for ADU signaling in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for ADU signaling). For example, the device 1505 or a component of the device 1505 may include a processor 1540 and memory 1530 coupled with or to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a centralized unit of a base station in accordance with examples as disclosed herein. For example, the communications manager 1520 may be configured as or otherwise support a means for transmitting, via a user plane interface with one or more distributed units of the base station, an indication of an ADU including a set of SDUs, the indication including one or more bits in a header associated with the user plane interface. The communications manager 1520 may be configured as or otherwise support a means for transmitting, based on transmitting the indication, a control signal that schedules a transmission of the set of SDUs corresponding to the ADU.

Additionally or alternatively, the communications manager 1520 may support wireless communication at a base station in accordance with examples as disclosed herein. For example, the communications manager 1520 may be configured as or otherwise support a means for communicating a set of SDUs with a UE, a correspondence between the set of SDUs and an ADU being indicated by at least one header of the set of SDUs. The communications manager 1520 may be configured as or otherwise support a means for identifying an absence of an SDU of the set of SDUs. The communications manager 1520 may be configured as or otherwise support a means for transmitting, to the UE, a signal associated with the SDU based on identifying the absence of the SDU, the signal proactively indicating information associated with the ADU to the UE.

By including or configuring the communications manager 1520 in accordance with examples as described herein, the device 1505 may support techniques for improved communication reliability, reduced latency, improved user experience related to improved ADU processing, reduced power consumption, more efficient utilization of communication resources, or improved coordination between devices.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for ADU signaling as described herein, or the processor 1540 and the memory 1530 may be otherwise configured to perform or support such operations.

Figure 16:
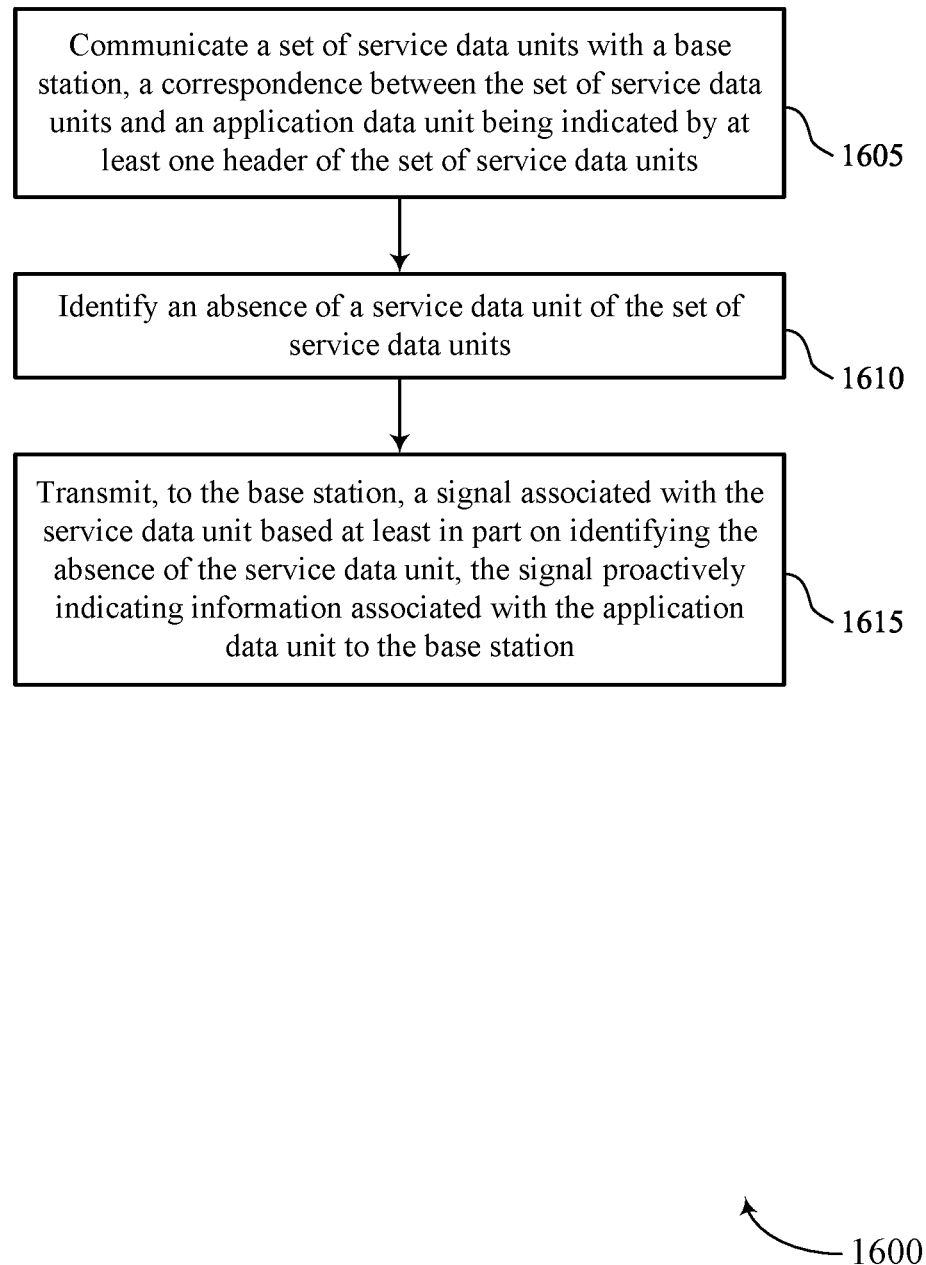
FIGS. 16 through 19 show flowcharts illustrating methods that support techniques for ADU signaling in accordance with aspects of the present disclosure.

FIG. 16 shows a flowchart illustrating a method 1600 that supports techniques for ADU signaling in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include communicating a set of SDUs with a base station, a correspondence between the set of SDUs and an ADU being indicated by at least one header of the set of SDUs. The operations of 1605 may be performed in accordance with examples as disclosed herein. In some examples, aspects of the operations of 1605 may be performed by an application data unit component 1025 as described with reference to FIG. 10.

At 1610, the method may include identifying an absence of an SDU of the set of SDUs. The operations of 1610 may be performed in accordance with examples as disclosed herein. In some examples, aspects of the operations of 1610 may be performed by a service data unit manager 1030 as described with reference to FIG. 10.

At 1615, the method may include transmitting, to the base station, a signal associated with the SDU based on identifying the absence of the SDU, the signal proactively indicating information associated with the ADU to the base station. The operations of 1615 may be performed in accordance with examples as disclosed herein. In some examples, aspects of the operations of 1615 may be performed by a signaling manager 1035 as described with reference to FIG. 10.

Figure 17:
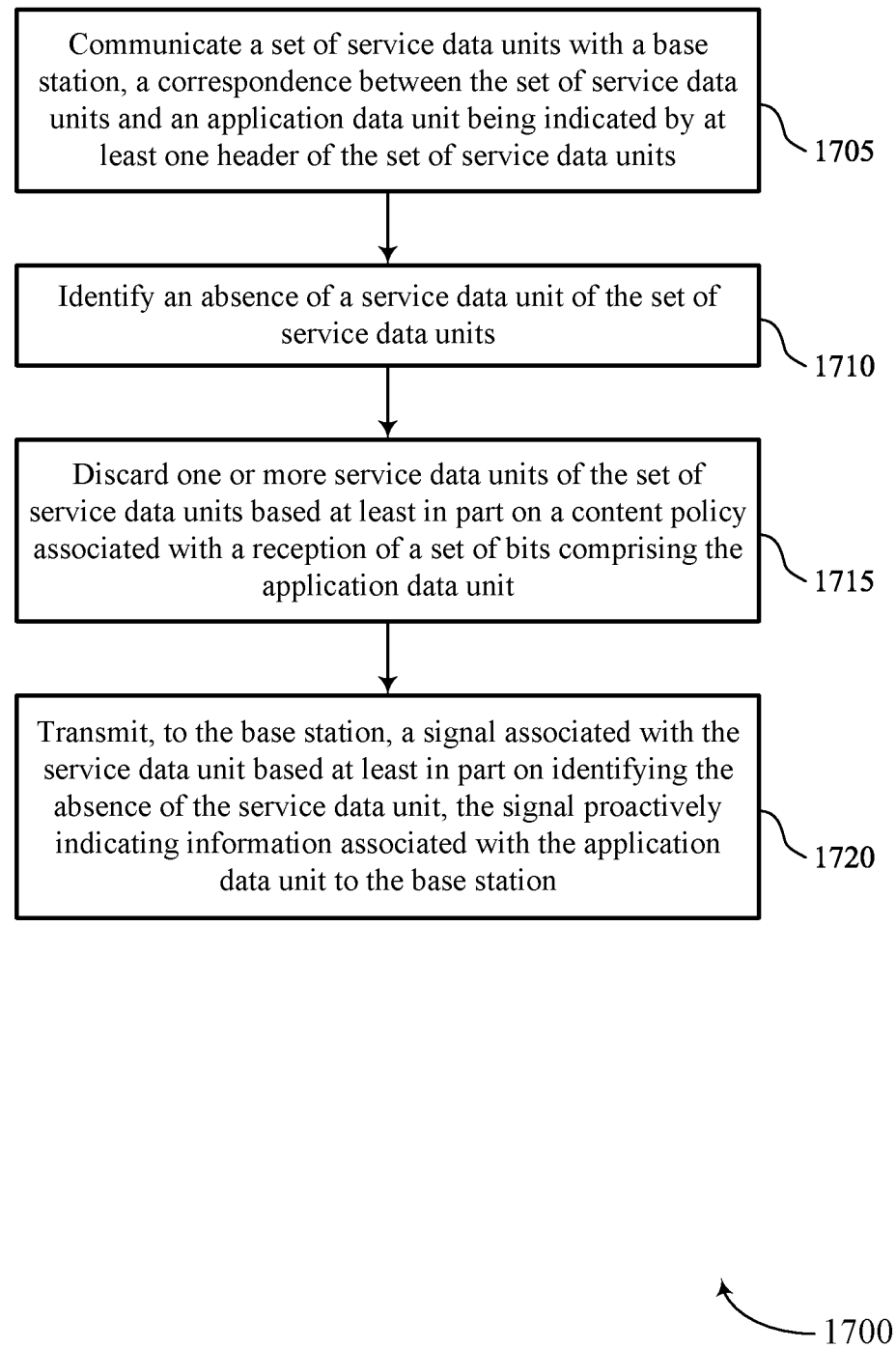

FIG. 17 shows a flowchart illustrating a method 1700 that supports techniques for ADU signaling in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include communicating a set of SDUs with a base station, a correspondence between the set of SDUs and an ADU being indicated by at least one header of the set of SDUs. The operations of 1705 may be performed in accordance with examples as disclosed herein. In some examples, aspects of the operations of 1705 may be performed by an application data unit component 1025 as described with reference to FIG. 10.

At 1710, the method may include identifying an absence of an SDU of the set of SDUs. The operations of 1710 may be performed in accordance with examples as disclosed herein. In some examples, aspects of the operations of 1710 may be performed by a service data unit manager 1030 as described with reference to FIG. 10.

At 1715, the method may include discarding one or more SDUs of the set of SDUs based on a content policy associated with a reception of a set of bits including the ADU. The operations of 1715 may be performed in accordance with examples as disclosed herein. In some examples, aspects of the operations of 1715 may be performed by a service data unit manager 1030 as described with reference to FIG. 10.

At 1720, the method may include transmitting, to the base station, a signal associated with the SDU based on identifying the absence of the SDU, the signal proactively indicating information associated with the ADU to the base station. The operations of 1720 may be performed in accordance with examples as disclosed herein. In some examples, aspects of the operations of 1720 may be performed by a signaling manager 1035 as described with reference to FIG. 10.

Figure 18:
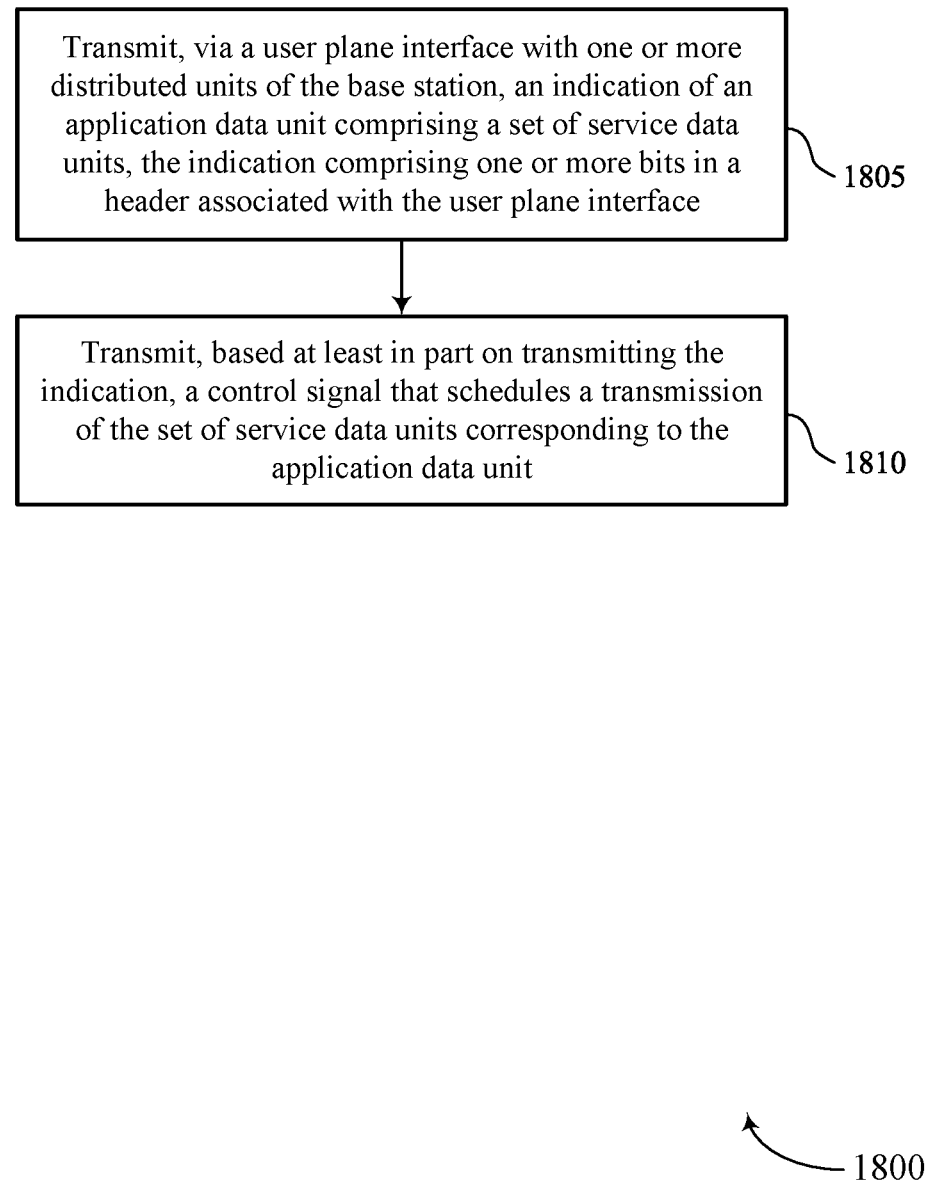

FIG. 18 shows a flowchart illustrating a method 1800 that supports techniques for ADU signaling in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting, via a user plane interface with one or more distributed units of the base station, an indication of an ADU including a set of SDUs, the indication including one or more bits in a header associated with the user plane interface. The operations of 1805 may be performed in accordance with examples as disclosed herein. In some examples, aspects of the operations of 1805 may be performed by an application data unit manager 1425 as described with reference to FIG. 14.

At 1810, the method may include transmitting, based on transmitting the indication, a control signal that schedules a transmission of the set of SDUs corresponding to the ADU. The operations of 1810 may be performed in accordance with examples as disclosed herein. In some examples, aspects of the operations of 1810 may be performed by a signaling component 1430 as described with reference to FIG. 14.

Figure 19:
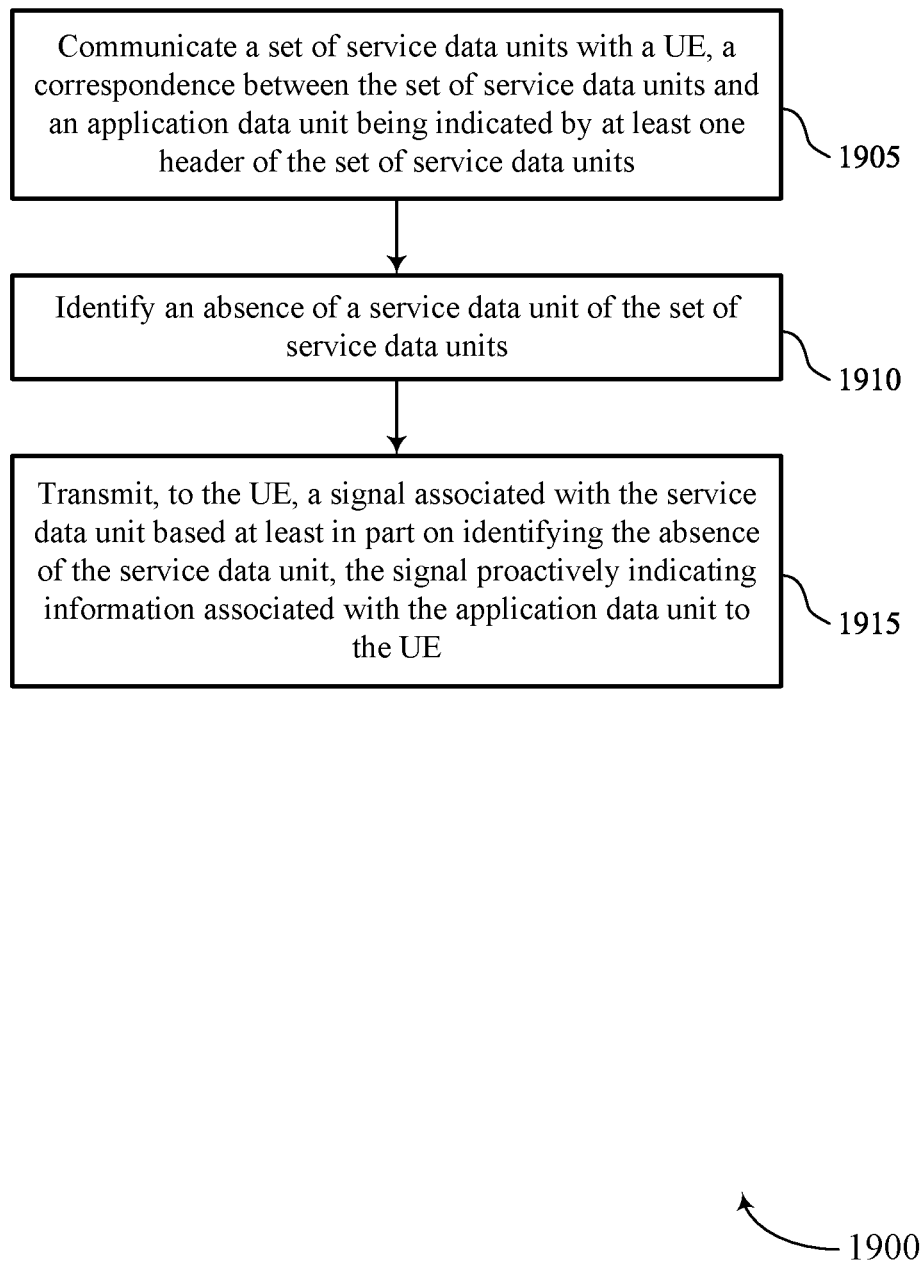

FIG. 19 shows a flowchart illustrating a method 1900 that supports techniques for ADU signaling in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include communicating a set of SDUs with a UE, a correspondence between the set of SDUs and an ADU being indicated by at least one header of the set of SDUs. The operations of 1905 may be performed in accordance with examples as disclosed herein. In some examples, aspects of the operations of 1905 may be performed by an application data unit manager 1425 as described with reference to FIG. 14.

At 1910, the method may include identifying an absence of an SDU of the set of SDUs. The operations of 1910 may be performed in accordance with examples as disclosed herein. In some examples, aspects of the operations of 1910 may be performed by a service data unit component 1435 as described with reference to FIG. 14.

At 1915, the method may include transmitting, to the UE, a signal associated with the SDU based on identifying the absence of the SDU, the signal proactively indicating information associated with the ADU to the UE. The operations of 1915 may be performed in accordance with examples as disclosed herein. In some examples, aspects of the operations of 1915 may be performed by a signaling component 1430 as described with reference to FIG. 14.

The following provides an overview of aspects of the present disclosure:

Aspect 1: A method for wireless communication at a UE, comprising: communicating, with a base station, a set of service data units, a correspondence between the set of service data units and an application data unit being indicated by at least one header of the set of service data units; identifying an absence of a service data unit of the set of service data units; and transmitting, to the base station, a signal associated with the service data unit based at least in part on identifying the absence of the service data unit, the signal proactively indicating information associated with the application data unit to the base station.

Aspect 2: The method of aspect 1, wherein transmitting the signal comprises: transmitting a request for a retransmission of the service data unit, wherein the signal comprises the request for the retransmission.

Aspect 3: The method of any of aspects 1 through 2, wherein transmitting the signal comprises: transmitting an indication of a status associated with the service data unit, wherein the signal comprises the indication.

Aspect 4: The method of aspect 3, wherein the status comprises a packet data convergence protocol (PDCP) status.

Aspect 5: The method of any of aspects 1 through 4, wherein transmitting the signal comprises: transmitting the service data unit in a retransmission.

Aspect 6: The method of aspect 5, wherein the service data unit is transmitted in the retransmission based at least in part on a delay budget associated with the application data unit.

Aspect 7: The method of any of aspects 1 through 6, further comprising: discarding one or more service data units of the set of service data units based at least in part on a content policy associated with a reception of a set of bits comprising the application data unit.

Aspect 8: The method of aspect 7, wherein the one or more discarded service data units comprise the service data unit; and the signal is transmitted based at least in part on discarding the one or more service data units.

Aspect 9: The method of any of aspects 1 through 8, wherein the absence of the service data unit is identified based at least in part on a presence of a second service data unit corresponding to a second application data unit that is scheduled after the application data unit.

Aspect 10: The method of any of aspects 1 through 9, wherein the service data unit comprises a packet data convergence protocol (PDCP) service data unit or an RLC service data unit.

Aspect 11: A method for wireless communication at a centralized unit of a base station, comprising: transmitting, via a user plane interface with one or more distributed units of the base station, an indication of an application data unit comprising a set of service data units, the indication comprising one or more bits in a header associated with the user plane interface; and transmitting, based at least in part on transmitting the indication, a control signal that schedules a transmission of the set of service data units corresponding to the application data unit.

Aspect 12: The method of aspect 11, wherein the one or more bits are included in a general packet radio service (GPRS) tunnelling protocol user (GTP-U) header of the header associated with the user plane interface.

Aspect 13: The method of aspect 11, wherein the one or more bits are outside a general packet radio service (GPRS) tunnelling protocol user (GTP-U) header of the header associated with the user plane interface.

Aspect 14: The method of any of aspects 11 through 13, wherein the one or more bits of the indication comprise a bit indicating that a payload associated with the header corresponds to the application data unit.

Aspect 15: The method of any of aspects 11 through 14, further comprising: determining that at least a first header of the set of service data units and a second header associated with a second user plane interface indicate a correspondence between the set of service data units and the application data unit; identifying an absence of a service data unit of the set of service data units; and transmitting a signal associated with the service data unit based at least in part on identifying the absence of the service data unit, the signal proactively indicating information associated with the application data unit.

Aspect 16: The method of aspect 15, wherein transmitting the signal comprises: transmitting an indication of a status associated with the service data unit, wherein the signal comprises the indication.

Aspect 17: The method of any of aspects 15 through 16, wherein the signal is transmitted based at least in part on a quantity of UE in communication with the base station, an error rate associated with the application data unit, a content policy associated with a reception of a set of bits comprising the application data unit, or any combination thereof.

Aspect 18: The method of any of aspects 15 through 17, further comprising: discarding one or more service data units of the set of service data units based at least in part on a content policy associated with a reception of a set of bits comprising the application data unit.

Aspect 19: The method of aspect 18, wherein the one or more discarded service data units comprise the service data unit; and the signal is transmitted based at least in part on discarding the one or more service data units.

Aspect 20: The method of any of aspects 15 through 19, wherein the absence of the service data unit is identified based at least in part on a presence of a second service data unit corresponding to a second application data unit that is scheduled after the application data unit.

Aspect 21: The method of any of aspects 15 through 20, wherein the service data unit comprises a packet data convergence protocol (PDCP) service data unit or an RLC service data unit.

Aspect 22: A method for wireless communication at a base station, comprising: communicating, with a UE, a set of service data units, a correspondence between the set of service data units and an application data unit being indicated by at least one header of the set of service data units; identifying an absence of a service data unit of the set of service data units; and transmitting, to the UE, a signal associated with the service data unit based at least in part on identifying the absence of the service data unit, the signal proactively indicating information associated with the application data unit to the UE.

Aspect 23: The method of aspect 22, wherein transmitting the signal comprises: transmitting a request for a retransmission of the service data unit, wherein the signal comprises the request for the retransmission.

Aspect 24: The method of any of aspects 22 through 23, wherein transmitting the signal comprises: transmitting an indication of a status associated with the service data unit, wherein the signal comprises the indication.

Aspect 25: The method of aspect 24, wherein the status comprises a packet data convergence protocol (PDCP) status.

Aspect 26: The method of any of aspects 22 through 25, wherein transmitting the signal comprises: transmitting the service data unit in a retransmission.

Aspect 27: The method of aspect 26, wherein the service data unit is transmitted in the retransmission based at least in part on a delay budget associated with the application data unit.

Aspect 28: The method of any of aspects 26 through 27, wherein the service data unit is transmitted via a component carrier in a carrier aggregation configuration; and the component carrier is selected based at least in part on a content policy associated with a reception of a set of bits comprising the application data unit.

Aspect 29: The method of any of aspects 22 through 28, further comprising: discarding one or more service data units of the set of service data units based at least in part on a content policy associated with a reception of a set of bits comprising the application data unit.

Aspect 30: The method of aspect 29, wherein the one or more discarded service data units comprise the service data unit; and the signal is transmitted based at least in part on discarding the one or more service data units.

Aspect 31: The method of any of aspects 22 through 30, further comprising: receiving, via a user plane interface with a centralized unit of the base station, an indication of the application data unit comprising the set of service data units, the indication comprising one or more bits in a header associated with the user plane interface; and receiving, based at least in part on receiving the indication, a control signal that schedules a transmission of the set of service data units corresponding to the application data unit.

Aspect 32: The method of any of aspects 22 through 31, wherein the absence of the service data unit is identified based at least in part on a presence of a second service data unit corresponding to a second application data unit that is scheduled after the application data unit.

Aspect 33: The method of any of aspects 22 through 32, wherein the service data unit comprises a packet data convergence protocol (PDCP) service data unit or an RLC service data unit.

Aspect 34: An apparatus for wireless communication at a UE, comprising a processor; memory coupled with the processor; and instructions stored in the memory and executable by the processor to cause the apparatus to perform a method of any of aspects 1 through 10.

Aspect 35: An apparatus for wireless communication at a UE, comprising at least one means for performing a method of any of aspects 1 through 10.

Aspect 36: A non-transitory computer-readable medium storing code for wireless communication at a UE, the code comprising instructions executable by a processor to perform a method of any of aspects 1 through 10.

Aspect 37: An apparatus for wireless communication at a centralized unit of a base station, comprising a processor; memory coupled with the processor; and instructions stored in the memory and executable by the processor to cause the apparatus to perform a method of any of aspects 11 through 21.

Aspect 38: An apparatus for wireless communication at a centralized unit of a base station, comprising at least one means for performing a method of any of aspects 11 through 21.

Aspect 39: A non-transitory computer-readable medium storing code for wireless communication at a centralized unit of a base station, the code comprising instructions executable by a processor to perform a method of any of aspects 11 through 21.

Aspect 40: An apparatus for wireless communication at a base station, comprising a processor; memory coupled with the processor; and instructions stored in the memory and executable by the processor to cause the apparatus to perform a method of any of aspects 22 through 33.

Aspect 41: An apparatus for wireless communication at a base station, comprising at least one means for performing a method of any of aspects 22 through 33.

Aspect 42: A non-transitory computer-readable medium storing code for wireless communication at a base station, the code comprising instructions executable by a processor to perform a method of any of aspects 22 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, within a packet data convergence protocol (PDCP) protocol data unit (PDU), an application data unit comprising a set of service data units from a network entity, a correspondence between the set of service data units and the application data unit being indicated by at least one header of the set of service data units; and
    identifying an absence of a service data unit of the set of service data units within the PDCP PDU received by the UE based at least in part on a presence of a second header corresponding to a second application data unit that is scheduled after the application data unit.

2. The method of claim 1, further comprising:
    transmitting, to the network entity, a signal associated with the service data unit based at least in part on identifying the absence of the service data unit, the signal proactively indicating information associated with the application data unit to the network entity.

3. The method of claim 2, wherein transmitting the signal comprises:
    transmitting a request for a retransmission of the service data unit, wherein the signal comprises the request for the retransmission.

4. The method of claim 2, wherein transmitting the signal comprises:
    transmitting an indication of a status associated with the service data unit, wherein the signal comprises the indication.

5. The method of claim 4, wherein the status comprises a packet data convergence protocol (PDCP) status.

6. The method of claim 2, wherein transmitting the signal comprises:
    transmitting the service data unit in a retransmission.

7. The method of claim 6, wherein the service data unit is transmitted in the retransmission based at least in part on a delay budget associated with the application data unit.

8. The method of claim 2, further comprising:
    discarding one or more service data units of the set of service data units based at least in part on a content policy associated with a reception of a set of bits comprising the application data unit.

9. The method of claim 8, wherein:
    the one or more discarded service data units comprise the service data unit; and
    the signal is transmitted based at least in part on discarding the one or more service data units.

10. A method for wireless communication at a centralized unit of a network entity, comprising:
    transmitting, via an F1-U interface with one or more distributed units of the network entity, an indication of an application data unit comprising a set of service data units, the indication comprising one or more bits in a header associated with the F1-U interface;
    transmitting, based at least in part on transmitting the indication, a control signal that schedules a transmission of the set of service data units corresponding to the application data unit;
    transmitting, based at least in part on the control signal, the set of service data units corresponding to the application data unit; and identifying an absence of a service data unit of the set of service data units based at least in part on a presence of a second header corresponding to a second application data unit that is scheduled after the application data unit.

11. The method of claim 10, wherein the one or more bits are included in a general packet radio service (GPRS) tunnelling protocol user (GTP-U) header of the header associated with the F1-U interface.

12. The method of claim 10, wherein the one or more bits are outside a general packet radio service (GPRS) tunnelling protocol user (GTP-U) header of the header associated with the F1-U interface.

13. The method of claim 10, wherein the one or more bits of the indication comprise a bit indicating that a payload associated with the header corresponds to the application data unit.

14. The method of claim 10, further comprising:
determining that at least a first header of the set of service data units and a third header associated with a second user plane interface indicate a correspondence between the set of service data units and the application data unit; and
transmitting a signal associated with the service data unit based at least in part on identifying the absence of the service data unit, the signal proactively indicating information associated with the application data unit.

15. The method of claim 14, wherein transmitting the signal comprises:
transmitting an indication of a status associated with the service data unit, wherein the signal comprises the indication.

16. The method of claim 14, wherein the signal is transmitted based at least in part on a quantity of user equipment (UE) in communication with the network entity, an error rate associated with the application data unit, a content policy associated with a reception of a set of bits comprising the application data unit, or any combination thereof.

17. The method of claim 14, further comprising:
discarding one or more service data units of the set of service data units based at least in part on a content policy associated with a reception of a set of bits comprising the application data unit.

18. The method of claim 17, wherein:
the one or more discarded service data units comprise the service data unit; and
the signal is transmitted based at least in part on discarding the one or more service data units.

19. A method for wireless communication at a network entity, comprising:
receiving a set of service data units from a user equipment (UE), a correspondence between the set of service data units and an application data unit being indicated by at least one header of the set of service data units;
identifying an absence of a service data unit of the set of service data units based at least in part on a presence of a second header corresponding to a second application data unit that is scheduled after the application data unit; and
transmitting, to the UE, a signal associated with the service data unit based at least in part on identifying the absence of the service data unit, the signal proactively indicating information associated with the application data unit to the UE.

20. The method of claim 19, wherein transmitting the signal comprises:

transmitting a request for a retransmission of the service data unit, wherein the signal comprises the request for the retransmission.

21. The method of claim 19, wherein transmitting the signal comprises:
transmitting an indication of a status associated with the service data unit, wherein the signal comprises the indication.

22. The method of claim 19, wherein transmitting the signal comprises:
transmitting the service data unit in a retransmission.

23. The method of claim 22, wherein the service data unit is transmitted in the retransmission based at least in part on a delay budget associated with the application data unit.

24. The method of claim 22, wherein:
the service data unit is transmitted via a component carrier in a carrier aggregation configuration; and
the component carrier is selected based at least in part on a content policy associated with a reception of a set of bits comprising the application data unit.

25. The method of claim 19, further comprising:
discarding one or more service data units of the set of service data units based at least in part on a content policy associated with a reception of a set of bits comprising the application data unit.

26. The method of claim 25, wherein:
the one or more discarded service data units comprise the service data unit; and
the signal is transmitted based at least in part on discarding the one or more service data units.

27. The method of claim 19, further comprising:
receiving, via a user plane interface with a centralized unit of the network entity, an indication of the application data unit comprising the set of service data units, the indication comprising one or more bits in a header associated with the user plane interface; and
receiving, based at least in part on receiving the indication, a control signal that schedules a transmission of the set of service data units corresponding to the application data unit.

28. A user equipment (UE) for wireless communication, comprising:
one or more memories storing processor-executable code; and
one or more processors coupled with the one or more memories and individually or collectively operable to execute the code to cause the UE to:
receive, within a packet data convergence protocol (PDCP) protocol data unit (PDU), an application data unit comprising a set of service data units from a network entity, a correspondence between the set of service data units and the application data unit being indicated by at least one header of the set of service data units; and
identify an absence of a service data unit of the set of service data units within the PDCP PDU received by the UE based at least in part on a presence of a second header corresponding to a second application data unit that is scheduled after the application data unit.

29. The UE of claim 28, wherein the one or more processors are individually or collectively operable to execute the code to cause the UE to:
transmit, to the network entity, a signal associated with the service data unit based at least in part on identifying the absence of the service data unit, the signal proactively indicating information associated with the application data unit to the network entity.

\* \* \* \* \*